United States Patent
Matake et al.

(10) Patent No.: US 12,046,779 B2
(45) Date of Patent: Jul. 23, 2024

(54) FUEL CELL POWER GENERATION SYSTEM FOR TREATING EXHAUST FUEL GAS

(71) Applicant: MITSUBISHI HEAVY INDUSTRIES, LTD., Tokyo (JP)

(72) Inventors: Norihisa Matake, Tokyo (JP); Yasushi Iwai, Tokyo (JP); Hiroyuki Ozawa, Yokohama (JP); Yoshiki Kato, Yokohama (JP); Nagao Hisatome, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/795,425

(22) PCT Filed: Jan. 27, 2021

(86) PCT No.: PCT/JP2021/002884
§ 371 (c)(1),
(2) Date: Jul. 26, 2022

(87) PCT Pub. No.: WO2021/153627
PCT Pub. Date: Aug. 5, 2021

(65) Prior Publication Data
US 2023/0048425 A1    Feb. 16, 2023

(30) Foreign Application Priority Data

Jan. 31, 2020  (JP) ................. 2020-015446

(51) Int. Cl.
*H01M 8/04* (2016.01)
*H01M 4/90* (2006.01)
(Continued)

(52) U.S. Cl.
CPC ..... *H01M 8/04097* (2013.01); *H01M 4/9016* (2013.01); *H01M 8/04111* (2013.01);
(Continued)

(58) Field of Classification Search
CPC ......... H01M 8/04097; H01M 8/04089; H01M 8/2457; H01M 8/04111; H01M 8/0432;
(Continued)

(56) References Cited

U.S. PATENT DOCUMENTS

2017/0338505 A1    11/2017  Sakai et al.
2020/0280080 A1*   9/2020   Yokoyama ........ H01M 8/04753
(Continued)

FOREIGN PATENT DOCUMENTS

JP    2004087350 A    3/2004
JP    2004319318 A    11/2004
(Continued)

OTHER PUBLICATIONS

International Search Report dated Apr. 13, 2021, issued in counterpart application No. PCT/JP2021/002884. (10 pages).
(Continued)

*Primary Examiner* — Raymond Alejandro
(74) *Attorney, Agent, or Firm* — WHDA, LLP

(57) ABSTRACT

A fuel cell power generation system is provided with at least one fuel cell module each of which includes a fuel cell having a fuel-side electrode, an electrolyte, and an oxygen-side electrode; at least one fuel supply line for supplying a fuel gas to the fuel-side electrode included in the at least one fuel cell module; at least one oxidizing gas supply line for supplying an oxidizing gas to the oxygen-side electrode included in the at least one fuel cell module; and a most downstream exhaust fuel gas line through which an exhaust fuel gas discharged from a most downstream module that is disposed most downstream in a flow of the fuel gas among the at least one fuel cell module flows.

14 Claims, 11 Drawing Sheets

(51) Int. Cl.
*H01M 8/04089* (2016.01)
*H01M 8/04111* (2016.01)
*H01M 8/0432* (2016.01)
*H01M 8/04746* (2016.01)
*H01M 8/2457* (2016.01)
*H01M 8/249* (2016.01)

(52) U.S. Cl.
CPC ..... *H01M 8/0432* (2013.01); *H01M 8/04761* (2013.01); *H01M 8/2457* (2016.02); *H01M 8/249* (2013.01)

(58) Field of Classification Search
CPC ......... H01M 8/04223; H01M 8/04761; H01M 8/249; H01M 4/9016
See application file for complete search history.

(56) References Cited

U.S. PATENT DOCUMENTS

| | | | |
|---|---|---|---|
| 2021/0111417 A1* | 4/2021 | Shimotori | H01M 8/0267 |
| 2022/0123333 A1 | 4/2022 | Kodo et al. | |
| 2022/0223887 A1 | 7/2022 | Wai et al. | |

FOREIGN PATENT DOCUMENTS

| | | | |
|---|---|---|---|
| JP | 2010108720 | A | 5/2010 |
| JP | 2015170447 | A | 9/2015 |
| JP | 2017212204 | A | 11/2017 |
| JP | 6300178 | B2 | 3/2018 |
| JP | 2018200748 | A | 12/2018 |
| JP | 6591112 | B1 | 10/2019 |
| JP | 2020009663 | A | 1/2020 |
| JP | 2020136229 | A | 8/2020 |

OTHER PUBLICATIONS

Notification of Transmittal of Translation of the International PreliminaryReport on Patentabililty (Form PCT/IB/338) issued in counterpart International Application No. PCT/JP2021/002884 dated Aug. 11, 2022 with Forms X PCT/IB/373, PCT/ISA/237, and PCT/IB/326. (14 pages).

* cited by examiner

FUEL CELL POWER GENERATION SYSTEM FOR TREATING EXHAUST FUEL GAS

TECHNICAL FIELD

The present disclosure relates to a fuel cell power generation system.

BACKGROUND

Exhaust fuel gas discharged from a fuel cell contains unused fuel such as methane, hydrogen, and carbon monoxide. Therefore, exhaust fuel gas from a fuel cell is usually treated to reduce the concentration of a predetermined unused component in the exhaust gas to less than a specified value (e.g., regulation value) before release from the system.

Patent Document 1 describes that exhaust fuel gas from a fuel cell is combusted by a combustor and then discharged. In the power generation system described in Patent Document 1, a catalytic combustor is provided in an exhaust fuel line through which the exhaust fuel from the fuel cell flows. The catalytic combustor is supplied with exhaust air from the fuel cell, and the exhaust fuel is combusted in the catalyst combustor using oxygen in the exhaust air as an oxidizing agent. The combustion gas thus produced is discharged through an exhaust gas line via a turbine.

CITATION LIST

Patent Literature

Patent Document 1: JP6591112B

SUMMARY

Problems to be Solved

Exhaust fuel gas discharged from a fuel cell has a relatively low concentration of fuel components. For this reason, when a flame combustion type combustor is used as the combustor for combusting the exhaust fuel gas, it may be necessary to input additional fuel from a fuel source in order to stably combust the exhaust fuel gas, or it may be necessary to limit the load change rate of the fuel cell so that the state (e.g., flow rate or composition) of the exhaust fuel gas does not change suddenly in order to avoid misfire in the combustor. Further, when a catalytic combustor is used as the combustor, it is necessary to periodically replace the combustor in order to maintain the catalytic performance, which may cause an increase in the cost.

In view of the above, an object of at least one embodiment of the present invention is to provide a fuel cell power generation system that can appropriately treat the exhaust fuel gas while suppressing the increase in the cost.

Solution to the Problems

A fuel cell power generation system according to at least one embodiment of the present invention is provided with: at least one fuel cell module each of which includes a fuel cell having a fuel-side electrode, an electrolyte, and an oxygen-side electrode; at least one fuel supply line for supplying a fuel gas to the fuel-side electrode included in the at least one fuel cell module; at least one oxidizing gas supply line for supplying an oxidizing gas to the oxygen-side electrode included in the at least one fuel cell module; and a most downstream exhaust fuel gas line through which an exhaust fuel gas discharged from a most downstream module that is disposed most downstream in a flow of the fuel gas among the at least one fuel cell module flows. The most downstream exhaust fuel gas line is configured to supply the exhaust fuel gas to the oxygen-side electrode included in any of the at least one fuel cell module.

Advantageous Effects

At least one embodiment of the present invention provides a fuel cell power generation system that can appropriately treat the exhaust fuel gas while suppressing the increase in the cost.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Hereinafter, for convenience of explanation, the positional relationship of components described using the expressions "upper" and "lower" with respect to the paper indicates the vertically upper side and the vertically lower side, respectively. Further, in the present embodiment, the upper/lower direction in the paper is not necessarily limited to the vertically upper/lower direction, but may correspond to, for example, the horizontal direction perpendicular to the vertical direction if the same effect is obtained in the vertical and horizontal directions.

Hereinafter, an embodiment in which a solid oxide fuel cell (SOFC) is used as a fuel cell constituting the fuel cell power generation system will be described, but in some embodiments, a fuel cell other than SOFC (for example, molten carbonate fuel cell (MCFC)) may be used as a fuel cell constituting the fuel cell power generation system.

(Configuration of Fuel Cell Module)

Figure 1:
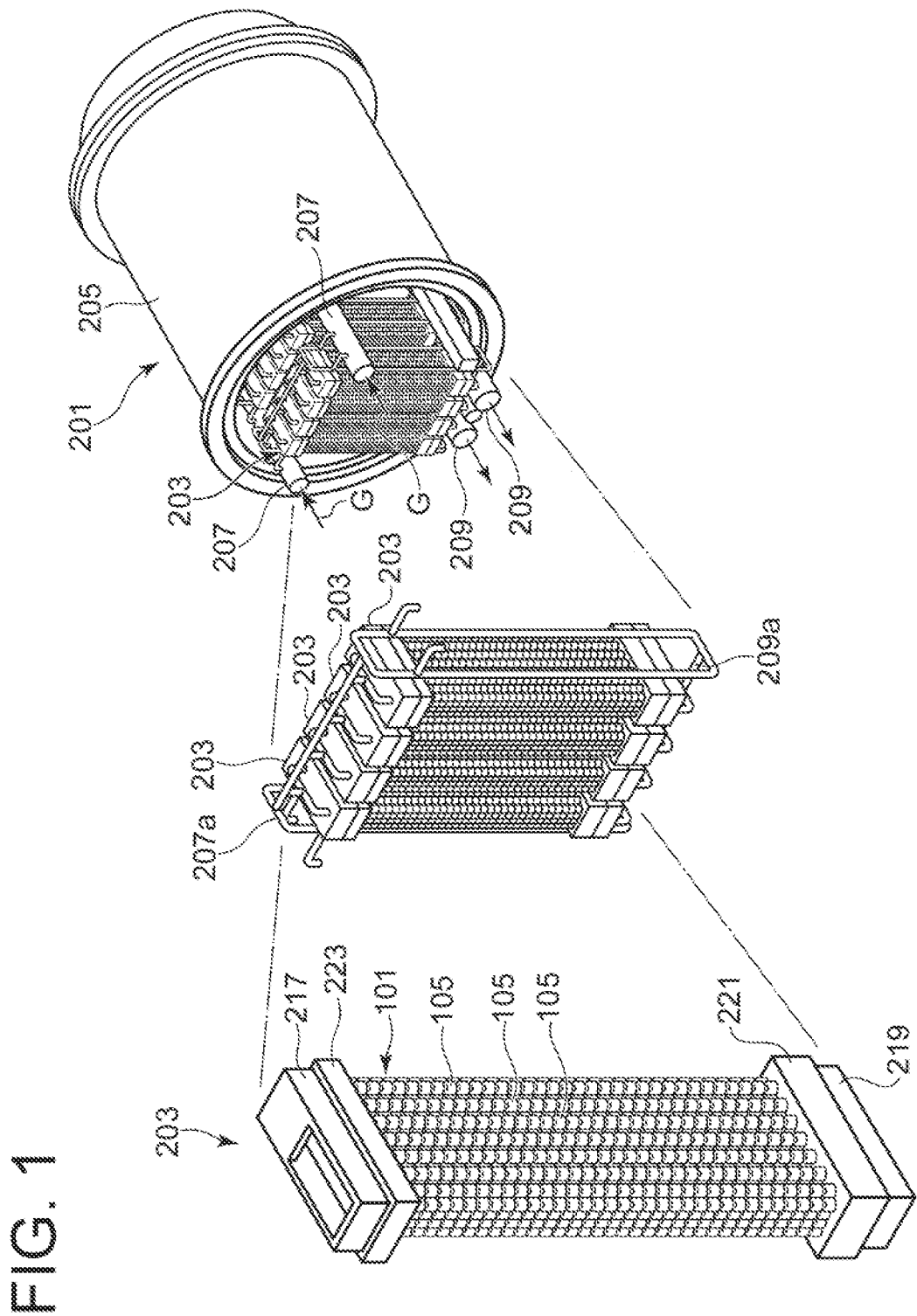
FIG. 1 is a schematic diagram of an SOFC module (fuel cell module) according to an embodiment.
Figure 2:
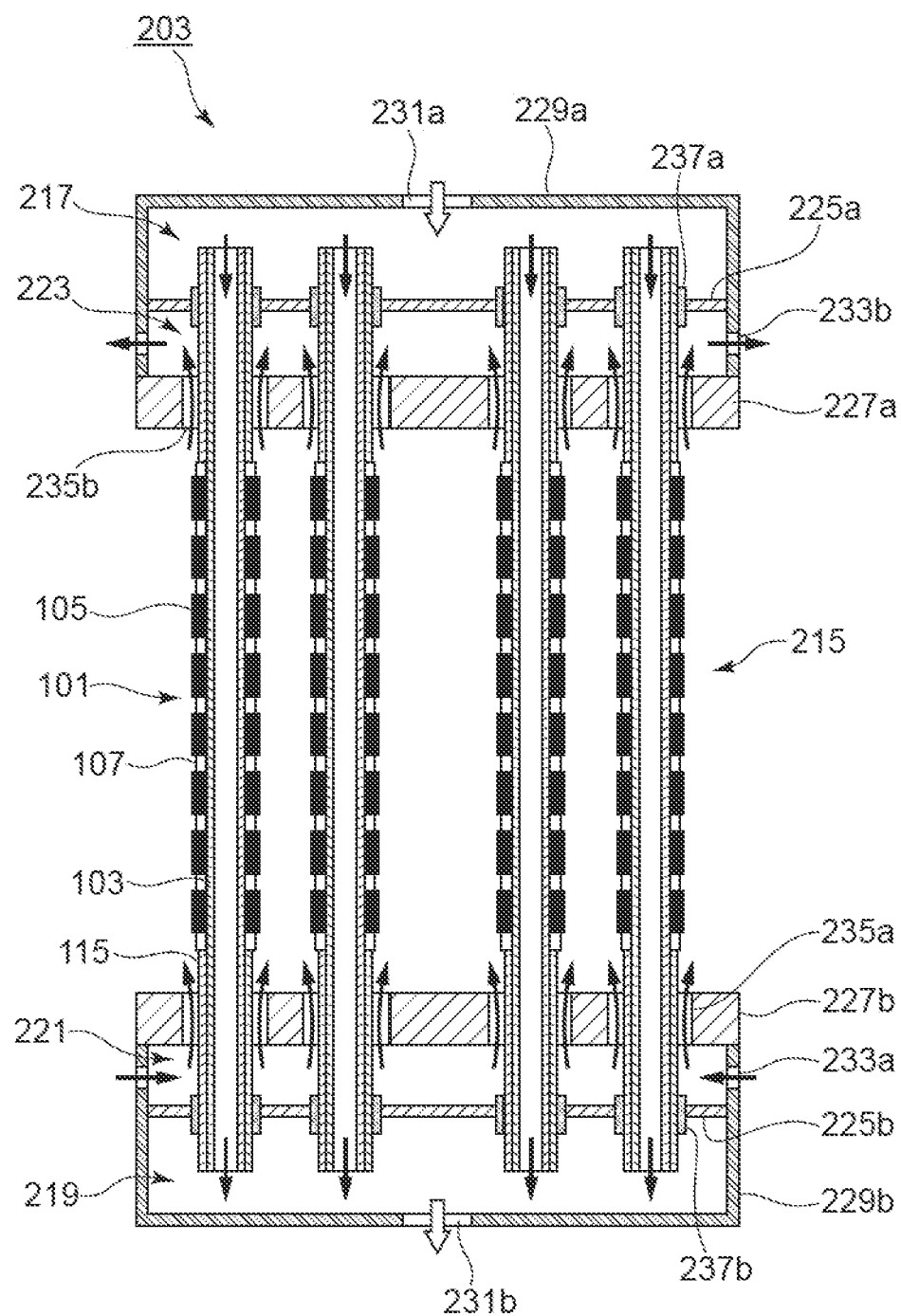
FIG. 2 is a schematic cross-sectional view of an SOFC cartridge (fuel cell cartridge) constituting the SOFC module (fuel cell module) according to an embodiment.
Figure 3:
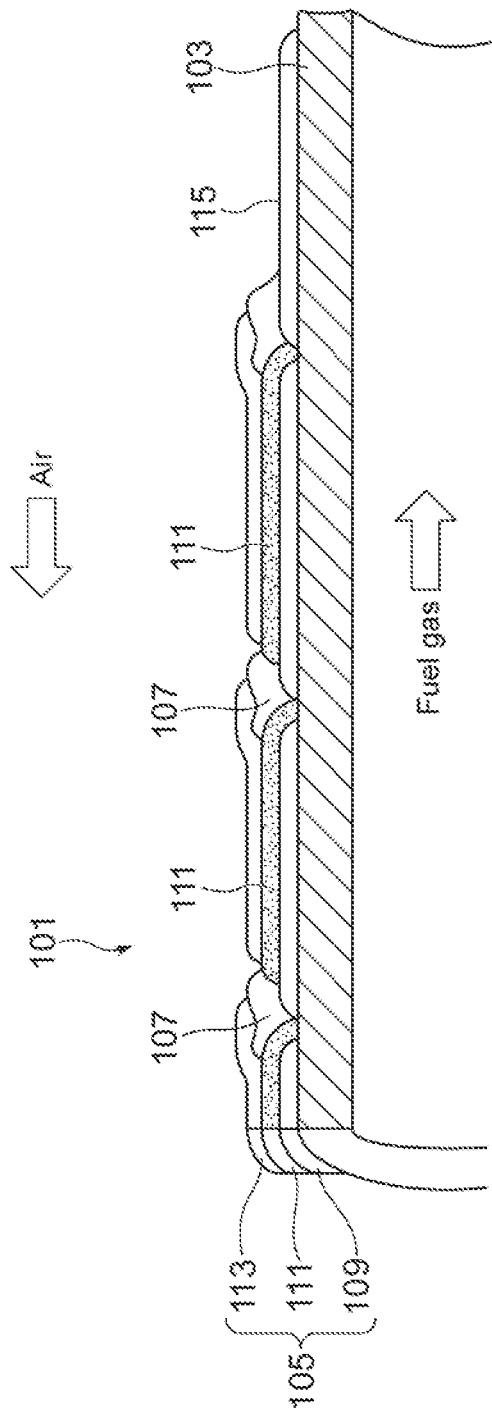
FIG. 3 is a schematic cross-sectional view of a cell stack constituting the SOFC module (fuel cell module) according to an embodiment.

First, with reference to FIGS. 1 to 3, a fuel cell module constituting the fuel cell power generation system according to some embodiments will be described. FIG. 1 is a schematic diagram of an SOFC module (fuel cell module) according to an embodiment. FIG. 2 is a schematic cross-sectional view of an SOFC cartridge (fuel cell cartridge) constituting the SOFC module (fuel cell module) according to an embodiment. FIG. 3 is a schematic cross-sectional view of a cell stack constituting the SOFC module (fuel cell module) according to an embodiment.

As shown in FIG. 1, an SOFC module (fuel cell module) 201 includes a plurality of SOFC cartridges (fuel cell cartridges) 203 and a pressure vessel 205 accommodating the plurality of SOFC cartridges 203. Although FIG. 1 illustrates a cylindrical SOFC cell stack 101, this is not necessarily the case, and a plate-like cell stack may be used, for example. The SOFC module 201 includes a fuel gas supply pipe 207, a plurality of fuel gas supply branch pipes 207*a*, a fuel gas exhaust pipe 209, and a plurality of fuel gas exhaust branch pipes 209*a*. Further, the SOFC module 201 includes an oxidizing gas supply pipe (not shown), oxidizing gas supply branch pipes (not shown), an oxidizing gas exhaust pipe (not shown), and oxidizing gas exhaust branch pipes (not shown).

The fuel gas supply pipe 207 is disposed outside the pressure vessel 205, is connected to a fuel gas supply part for supplying a fuel gas having a predetermined gas composition and a predetermined flow rate corresponding to the amount of power generated by the SOFC module 201, and is connected to the plurality of fuel gas supply branch pipes 207*a*. The fuel gas supply pipe 207 divides and distributes the fuel gas supplied from the fuel gas supply part at a predetermined flow rate to the plurality of fuel gas supply branch pipes 207*a*. The fuel gas supply branch pipes 207*a* are connected to the fuel gas supply pipe 207 and the plurality of SOFC cartridges 203. The fuel gas supply branch pipes 207*a* guide the fuel gas supplied from the fuel gas supply pipe 207 to the plurality of SOFC cartridges 203 at a substantially equal flow rate to substantially equalize the power generation performance of the SOFC cartridges 203.

The fuel gas exhaust branch pipes 209*a* are connected to the plurality of SOFC cartridges 203 and the fuel gas exhaust pipe 209. The fuel gas exhaust branch pipes 209*a* guide the exhaust fuel gas discharged from the SOFC cartridges 203 to the fuel gas exhaust pipe 209. The fuel gas exhaust pipe 209 is connected to the plurality of fuel gas exhaust branch pipes 209*a* and is disposed outside the pressure vessel 205. The fuel gas exhaust pipe 209 guides the exhaust fuel gas introduced from the fuel gas exhaust branch pipes 209*a* at a substantially equal flow rate to the outside of the pressure vessel 205.

Since the pressure vessel 205 is used at an internal pressure of 0.1 MPa to about 3 MPa and an internal temperature of atmospheric temperature to about 550° C., a material having high proof stress and corrosion resistance to an oxidizing agent such as oxygen contained in the oxidizing gas is used for the pressure vessel 205. For example, a stainless steel material such as SUS304 is preferable.

Here, the present embodiment describes the case where the SOFC cartridges 203 are assembled and stored in the pressure vessel 205, but the embodiment is not limited thereto. For example, the SOFC cartridges 203 may be stored in the pressure vessel 205 without being assembled.

As shown in FIG. 2, the SOFC cartridge 203 includes a plurality of cell stacks 101, a power generation chamber 215, a fuel gas supply header 217, a fuel gas exhaust header 219, an oxidizing gas (air) supply header 221, and an oxidizing gas exhaust header 223. Further, the SOFC cartridge 203 includes an upper tube plate 225*a*, a lower tube plate 225*b*, an upper heat insulation body 227*a*, and a lower heat insulation body 227*b*. In the present embodiment, in the SOFC cartridge 203, the fuel gas supply header 217, the fuel gas exhaust header 219, the oxidizing gas supply header 221, and the oxidizing gas exhaust header 223 are arranged as shown in FIG. 2 so that the fuel gas and the oxidizing gas flow inside and outside the cell stack 101 in opposite directions, but this is not necessarily the case. For example, the fuel gas and the oxidizing gas may flow inside and outside the cell stack 101 in parallel, or the oxidizing gas may flow in a direction perpendicular to the longitudinal direction of the cell stack 101.

The power generation chamber 215 is a region formed between the upper heat insulation body 227*a* and the lower heat insulation body 227*b*. The power generation chamber 215 is a region where fuel cells (single fuel cells) 105 of the cell stacks 101 are arranged and where the fuel gas and the oxidizing gas are electrochemically reacted to generate electric power. The temperature in the power generation chamber 215 near the center in the longitudinal direction of the cell stack 101 is monitored by a temperature measuring part (e.g., temperature sensor or thermocouple) and becomes a high temperature atmosphere of approximately 700° C. to 1000° C. during the steady operation of the fuel cell module 201.

The fuel gas supply header 217 is a region surrounded by an upper casing 229*a* of the SOFC cartridge 203 and the upper tube plate 225*a*, and communicates with the fuel gas supply branch pipe 207*a* by a fuel gas supply hole 231*a* provided in the upper portion of the upper casing 229*a*. Further, the cell stacks 101 are joined by the upper tube plate 225*a* and a seal member 237*a*. The fuel gas supply header 217 guides the fuel gas supplied from the fuel gas supply branch pipe 207*a* through the fuel gas supply hole 231*a* into substrate tubes 103 of the cell stacks 101 at a substantially uniform flow rate to substantially equalize the power generation performance of the cell stacks 101.

The fuel gas exhaust header 219 is a region surrounded by a lower casing 229*b* of the SOFC cartridge 203 and the lower tube plate 225*b*, and communicates with the fuel gas exhaust branch pipe 209*a* (not shown) by a fuel gas exhaust hole 231*b* provided in the lower casing 229*b*. Further, the cell stacks 101 are joined by the lower tube plate 225*b* and a seal member 237*b*. The fuel gas exhaust header 219 collects the exhaust fuel gas having passed through the substrate tubes 103 of the cell stacks 101 and supplied to the fuel gas exhaust header 219 and guides it to the fuel gas exhaust branch pipe 209*a* through the fuel gas exhaust hole 231*b*.

The oxidizing gas having a predetermined gas composition and a predetermined flow rate is divided to the oxidizing gas supply branch pipes according to the amount of power generated by the SOFC module 201, and is supplied to the SOFC cartridges 203. The oxidizing gas supply header 221 is a region surrounded by the lower casing 229*b*, the lower tube plate 225*b*, and the lower heat insulation body (support body) 227*b* of the SOFC cartridge 203, and communicates with the oxidizing gas supply branch pipe (not shown) by oxidizing gas supply holes 233*a* provided in the side surfaces of the lower casing 229*b*. The oxidizing gas supply header 221 guides the oxidizing gas supplied from the oxidizing gas supply branch pipe (not shown) through the oxidizing gas supply holes 233*a* at a predetermined flow rate to the power generation chamber 215 through oxidizing gas supply gaps 235a, which will be described later.

The oxidizing gas exhaust header 223 is a region surrounded by the upper casing 229a, the upper tube plate 225a, and the upper heat insulation body (support body) 227a of the SOFC cartridge 203, and communicates with the oxidizing gas exhaust branch pipe (not shown) by oxidizing gas exhaust holes 233b provided in the side surfaces of the upper casing 229a. The oxidizing gas exhaust header 223 guides the exhaust oxidizing gas supplied from the power generation chamber 215 to the oxidizing gas exhaust header 223 through the oxidizing gas exhaust gaps 235b, which will be described later, to the oxidizing gas exhaust branch pipe (not shown) through the oxidizing gas exhaust hole 233b.

The upper tube plate 225a is fixed to the side plates of the upper casing 229a between the top plate of the upper casing 229a and the upper heat insulation body 227a so that the upper tube plate 225a, the top plate of the upper casing 229a, and the upper heat insulation body 227a are substantially parallel to each other. Further, the upper tube plate 225a has a plurality of holes corresponding to the number of cell stacks 101 disposed in the SOFC cartridge 203, and the cell stacks 101 are inserted into the corresponding holes. The upper tube plate 225a air-tightly supports one end portions of the cell stacks 101 via one or both of sealing members 237a and adhesive members, and separates the fuel gas supply header 217 from the oxidizing gas exhaust header 223.

The upper heat insulation body 227a is disposed at a lower end portion of the upper casing 229a so that the upper heat insulation body 227a, the top plate of the upper casing 229a, and the upper tube plate 225a are substantially parallel to each other, and is fixed to the side plates of the upper casing 229a. Further, the upper heat insulation body 227a has a plurality of holes corresponding to the number of cell stacks 101 disposed in the SOFC cartridge 203. The diameter of each hole is set to be larger than the outer diameter of each cell stack 101. The upper heat insulation body 227a is provided with oxidizing gas exhaust gaps 235b formed between the inner surface of each hole and the outer surface of each cell stack 101 inserted through the upper heat insulation body 227a.

The upper heat insulation body 227a separates the power generation chamber 215 from the oxidizing gas exhaust header 223 and prevents the atmosphere around the upper tube plate 225a from becoming hot, suppressing a decrease in the strength and an increase in the corrosion due to the oxidizing agent contained in the oxidizing gas. Although the parts such as the upper tube plate 225a are made of a metal material having high temperature durability such as Inconel, it prevents the upper tube plate 225a from being exposed to high temperature in the power generation chamber 215 and increasing the temperature difference which may cause thermal deformation. Further, the upper heat insulation body 227a allows the oxidizing gas having passed through the power generation chamber 215 and exposed to high temperature to flow into the oxidizing gas exhaust header 223 through the oxidizing gas exhaust gaps 235b.

According to the present embodiment, with the structure of the SOFC cartridge 203, the fuel gas and the oxidizing gas flow inside and outside the cell stack 101 in opposite directions. The exhaust oxidizing gas thus exchanges heat with the fuel gas supplied to the power generation chamber 215 through the inside of the substrate tubes 103, so that the exhaust oxidizing gas is cooled to the extent that the upper tube plate 225a made of a metal material does not deform or buckle, and is supplied to the oxidizing gas exhaust header 223. Further, the fuel gas is heated by heat exchange with the exhaust oxidizing gas discharged from the power generation chamber 215 and is supplied to the power generation chamber 215. As a result, the fuel gas preheated to a temperature suitable for power generation can be supplied to the power generation chamber 215 without a heater or the like.

The lower tube plate 225b is fixed to the side plates of the lower casing 229b between the bottom plate of the lower casing 229b and the lower heat insulation body 227b so that the lower tube plate 225b, the bottom plate of the lower casing 229b, and the lower heat insulation body 227b are substantially parallel to each other. Further, the lower tube plate 225b has a plurality of holes corresponding to the number of cell stacks 101 disposed in the SOFC cartridge 203, and the cell stacks 101 are inserted into the corresponding holes. The lower tube plate 225b air-tightly supports the other end portions of the cell stacks 101 via one or both of sealing members 237b and adhesive members, and separates the fuel gas exhaust header 219 from the oxidizing gas supply header 221.

The lower heat insulation body 227b is disposed at an upper end portion of the lower casing 229b so that the lower heat insulation body 227b, the bottom plate of the lower casing 229b, and the lower tube plate 225b are substantially parallel to each other, and is fixed to the side plates of the lower casing 229b. Further, the lower heat insulation body 227b has a plurality of holes corresponding to the number of cell stacks 101 disposed in the SOFC cartridge 203. The diameter of each hole is set to be larger than the outer diameter of each cell stack 101. The lower heat insulation body 227b is provided with oxidizing gas supply gaps 235a formed between the inner surface of each hole and the outer surface of each cell stack 101 inserted through the lower heat insulation body 227b.

The lower heat insulation body 227b separates the power generation chamber 215 from the oxidizing gas supply header 221 and prevents the atmosphere around the lower tube plate 225b from becoming hot, suppressing a decrease in the strength and an increase in the corrosion due to the oxidizing agent contained in the oxidizing gas. Although the parts such as the lower tube plate 225b are made of a metal material having high temperature durability such as Inconel, it prevents the lower tube plate 225b from being exposed to high temperature and increasing the temperature difference which may cause thermal deformation. Further, the lower heat insulation body 227b allows the oxidizing gas supplied to the oxidizing gas supply header 221 to flow into the power generation chamber 215 through the oxidizing gas supply gaps 235a.

According to the present embodiment, with the structure of the SOFC cartridge 203, the fuel gas and the oxidizing gas flow inside and outside the cell stack 101 in opposite directions. The exhaust fuel gas passing the power generation chamber 215 through the inside of the substrate tubes 103 thus exchanges heat with the oxidizing gas supplied to the power generation chamber 215, so that the exhaust fuel gas is cooled to the extent that the lower tube plate 225b made of a metal material does not deform or buckle, and is supplied to the fuel gas exhaust header 219. Further, the oxidizing gas is heated by heat exchange with the exhaust fuel gas and is supplied to the power generation chamber 215. As a result, the oxidizing gas heated to a temperature required for power generation can be supplied to the power generation chamber 215 without a heater or the like.

The DC power generated in the power generation chamber 215 is directed to the vicinity of the end of the cell stack 101 by a lead film 115 made of, for example, Ni/YSZ provided in the plurality of fuel cells 105, and is then collected to a collector rod (not shown) of the SOFC cartridge 203 via a current collector plate (not shown), and is taken out from each SOFC cartridge 203. A predetermined number of SOFC cartridges 203 are connected in series or parallel, and the DC power taken out from each SOFC cartridge 203 by the collector rod is transferred to the outside of the SOFC module 201, converted into predetermined AC power with a power conversion device (e.g., inverter) of a power conditioner or the like (not shown), and supplied to a power supply destination (e.g., load facility or electric power system).

As shown in FIG. 3, the cell stack 101 includes a substrate tube 103 of cylindrical shape, for example, a plurality of fuel cells (single fuel cells) 105 formed on the outer peripheral surface of the substrate tube 103, and an interconnector 107 formed between each adjacent fuel cells 105. The fuel cell 105 is formed by laminating a fuel-side electrode 109, an electrolyte 111, and an oxygen-side electrode 113. Further, the cell stack 101 includes a lead film 115 electrically connected to the oxygen-side electrode 113 of the fuel cell 105 formed at one end in the axial direction of the substrate tube 103, and a lead film 115 electrically connected to the fuel-side electrode 109 of the fuel cell 105 formed at the other end in the axial direction of the substrate tube 103 among the plurality of fuel cells 105 formed on the outer peripheral surface of the substrate tube 103.

The substrate tube 103 is made of a porous material, and is mainly composed of, for example, CaO-stabilized $ZrO_2$ (CSZ), a mixture of CSZ and nickel oxide (NiO) (CSZ+ NiO), $Y_2O_3$-stabilized $ZrO_2$ (YSZ), $MgAl_2O_4$, or the like. The substrate tube 103 supports the fuel cells 105, the interconnectors 107, and the lead films 115, and diffuses the fuel gas supplied to the inner peripheral surface of the substrate tube 103 to the fuel-side electrodes 109 formed on the outer peripheral surface of the substrate tube 103 through pores of the substrate tube 103.

The fuel-side electrode 109 is composed of an oxide of a composite material of Ni and zirconia-based electrolyte material, for example, Ni/YSZ. The thickness of the fuel-side electrode 109 may be 50 μm to 250 μm. The fuel-side electrode 109 may be formed by screen printing slurry. In this case, in the fuel-side electrode 109, Ni, which is a component of the fuel-side electrode 109, has catalysis on the fuel gas. The catalysis is to cause the fuel gas supplied via the substrate tube 103, for example, a mixed gas of methane ($CH_4$) and steam to react to be reformed into hydrogen ($H_2$) and carbon monoxide (CO). Further, the fuel-side electrode 109 causes hydrogen ($H_2$) and carbon monoxide (CO) obtained by reforming to electrochemically react with oxygen ions ($O^{2-}$) supplied via the electrolyte 111 in the vicinity of the interface with the electrolyte 111 to produce water ($H_2O$) and carbon dioxide ($CO_2$). The fuel cell 105 generates power by electrons emitted from the oxygen ions at this time.

As the fuel gas that can be supplied and used for the fuel-side electrode 109 of the solid oxide fuel cell, there may be mentioned hydrogen ($H_2$), carbon monoxide (CO), hydrocarbon gas such as methane ($CH_4$), city gas, natural gas, and gasified gas produced by a gasification facility using carbon-containing raw materials such as petroleum, methanol, and coal.

As the electrolyte 111, YSZ having gas-tightness that makes it difficult for gas to pass through and high oxygen ion conductivity at high temperature is mainly used. The electrolyte 111 moves oxygen ions ($O^{2-}$) generated in the oxygen-side electrode to the fuel-side electrode. The thickness of the electrolyte 11 disposed on the surface of the fuel-side electrode 109 may be 10 μm to 100 μm. The electrolyte 111 may be formed by screen printing slurry.

The oxygen-side electrode 113 is composed of, for example, a $LaSrMnO_3$-based oxide or a $LaCoO_3$-based oxide. The oxygen-side electrode 113 may be formed by screen printing slurry or applying slurry with a dispenser. The oxygen-side electrode 113 dissociates oxygen in the supplied oxidizing gas such as air in the vicinity of the interface with the electrolyte 111 to generate oxygen ions ($O^{2-}$).

The oxygen-side electrode 113 may have a two-layer structure. In this case, the oxygen-side electrode layer (oxygen-side electrode intermediate layer) closer to the electrolyte 111 is made of a material having high ionic conductivity and excellent catalytic activity. The oxygen-side electrode layer (oxygen-side electrode conductive layer) on the oxygen-side electrode intermediate layer may be composed of a perovskite oxide represented by Sr and Ca-doped $LaMnO_3$. With this configuration, it is possible to improve the power generation performance.

The oxidizing gas is a gas that contains about 15% to 30% oxygen, typically air is suitable, but other gases can also be used, such as a mixture of combustion flue gas and air, or a mixture of oxygen and air.

The interconnector 107 is composed of a conductive perovskite oxide represented by $M_{1-x}L_xTiO_3$ (M is an alkaline earth metal element, and L is a lanthanoid element) such as $SrTiO_3$-based materials, and is formed by screen printing slurry. The interconnector 107 is composed of a dense film to prevent the mixing of the fuel gas and the oxidizing gas. Further, the interconnector 107 has stable durability and electrical conductivity in both an oxidizing atmosphere and a reducing atmosphere. The interconnector 107 electrically connects the oxygen-side electrode 113 of one of adjacent fuel cells 105 and the fuel-side electrode 109 of the other fuel cell 105 to connect the adjacent fuel cells 105 in series.

The lead film 115 needs to have electronic conductivity and coefficient of thermal expansion close to that of other materials constituting the cell stack 101. Thus, it is composed of a composite material of Ni and zirconia-based electrolyte material such as Ni/YSZ, or $M_{1-x}L_xTiO_3$ (M is an alkaline earth metal element, and L is a lanthanoid element) such as $SrTiO_3$-based materials. The lead film 115 conducts the DC power generated by the fuel cells 105 connected in series by the interconnector 107 to near the end of the cell stack 101.

In some embodiments, instead of providing the fuel-side electrode or the oxygen-side electrode separately from the substrate tube as described above, the fuel-side electrode or the oxygen-side electrode may be thickly formed so as to also serve as the substrate tube. Further, although the present embodiment describes the substrate tube of cylindrical shape, the cross-section of the substrate tube is not necessarily limited to a circular shape, and may be, for example, an elliptical shape, as long as the substrate tube is tubular. The cell stack may be flat tubular in which the peripheral surface of the cylinder is vertically pressed.

(Configuration of Fuel Cell Power Generation System)

Figure 4A:
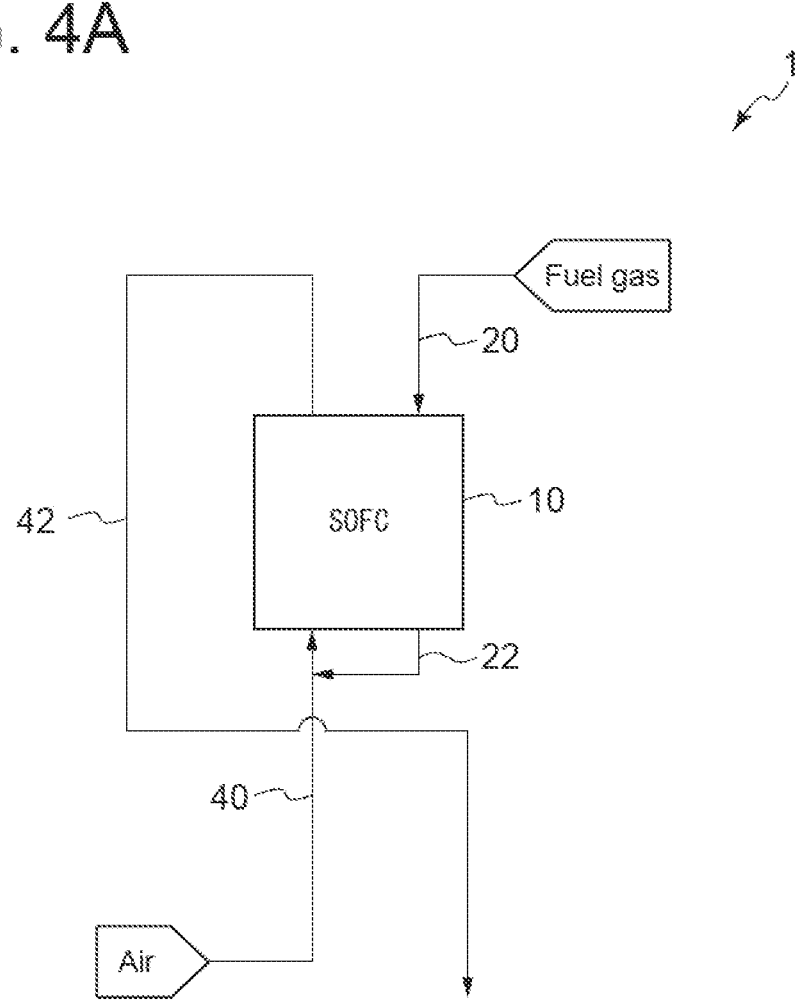
FIG. 4A is a schematic configuration diagram of the fuel power generation system according to some embodiments.
Figure 4B:
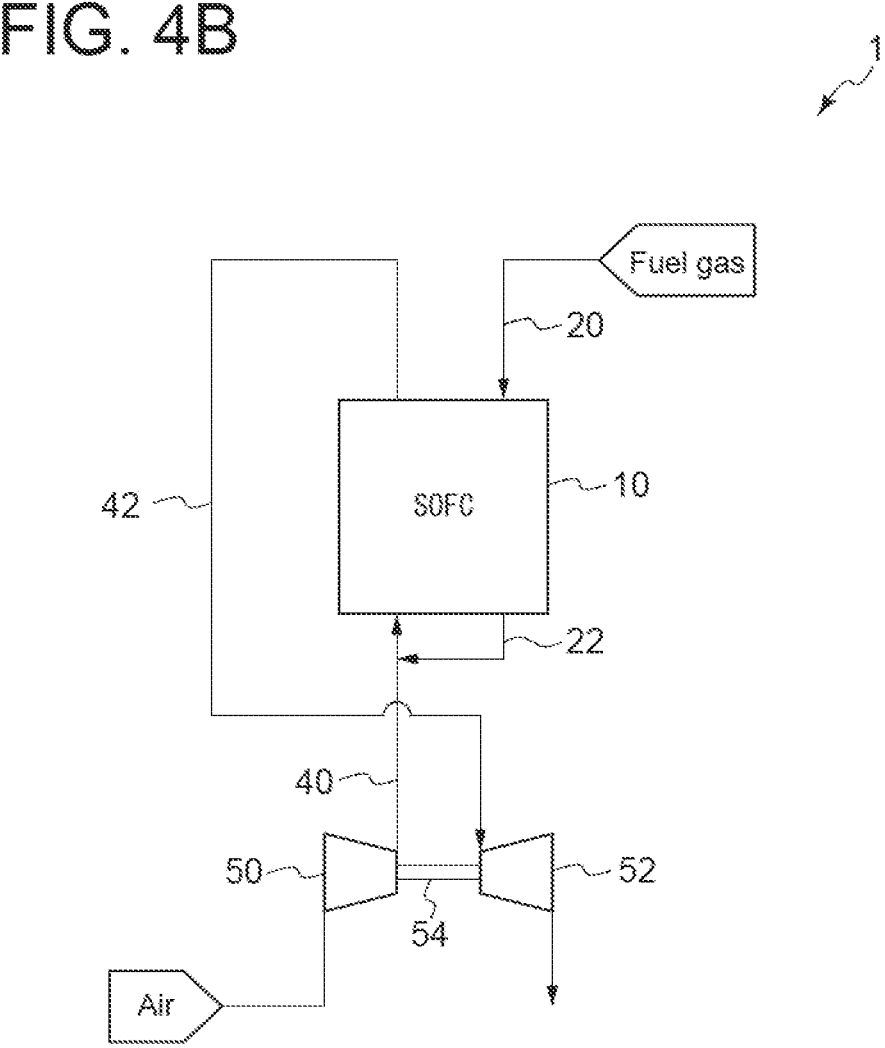
FIG. 4B is a schematic configuration diagram of the fuel power generation system according to some embodiments.

Next, with reference to FIGS. 4A to 10, the fuel cell power generation system (also referred to as "power generation system") according to some embodiments will be described. FIGS. 4A and 4B are each a schematic configuration diagram of the fuel power generation system according to some embodiments. FIGS. 5 to 10 are each a configuration diagram of the fuel power generation system according to an embodiment.

As shown in FIGS. 4A and 4B, the power generation system (fuel cell power generation system) 1 according to an embodiment includes a fuel cell part 10 including at least one fuel cell module 201 (see FIG. 1), a fuel supply line 20 for supplying a fuel gas to the fuel cell part 10, an oxidizing gas supply line 40 for supplying an oxidizing gas (e.g., air) to the fuel cell part 10, an exhaust fuel gas line 22 through which an exhaust fuel gas from the fuel cell part 10 flows, and an exhaust oxidizing gas line 42 through which an exhaust oxidizing gas from the fuel cell part 10 flows.

In some embodiments, the oxidizing gas supply line 40 is provided with a booster (for example, a compressor 50 shown in FIG. 4B) for pressurizing the oxidizing gas supplied to the fuel cell part 10, and the oxidizing gas pressurized by the booster is supplied to the oxygen-side electrode 113 of the fuel cell module 201. The booster may be a compressor or a blower, for example.

In some embodiments, the exhaust oxidizing gas line 42 is provided with a turbine 52 configured to be driven by the exhaust oxidizing gas. As shown in FIG. 4B, the compressor 50 and the turbine 52 may be connected via a rotational shaft 54, and the compressor 50 may be rotary driven by the turbine 52. Alternatively, the turbine 52 may be connected to a generator configured to be driven by the turbine 52.

As shown in FIGS. 5 to 10, the fuel cell part 10 includes at least one fuel cell module 201. As already described, the fuel cell module 201 includes one or more fuel cell cartridges 203, and each fuel cell cartridge 203 includes a plurality of cell stacks 101 each of which includes a plurality of fuel cells 105 (see FIGS. 1 and 2). Each fuel cell 105 includes the fuel-side electrode 109, the electrolyte 111, and the oxygen-side electrode 113 (see FIG. 3).

Figure 5:
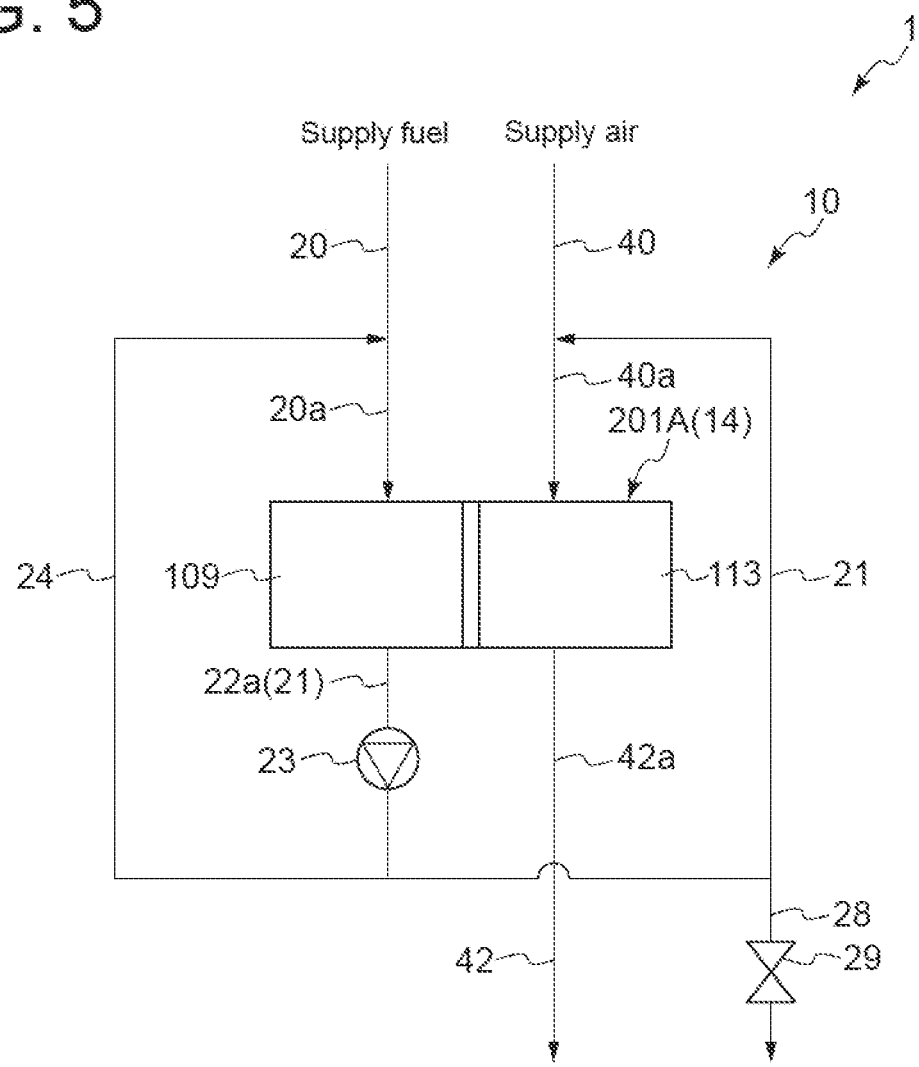
FIG. 5 is a configuration diagram of the fuel power generation system according to an embodiment.
Figure 6:
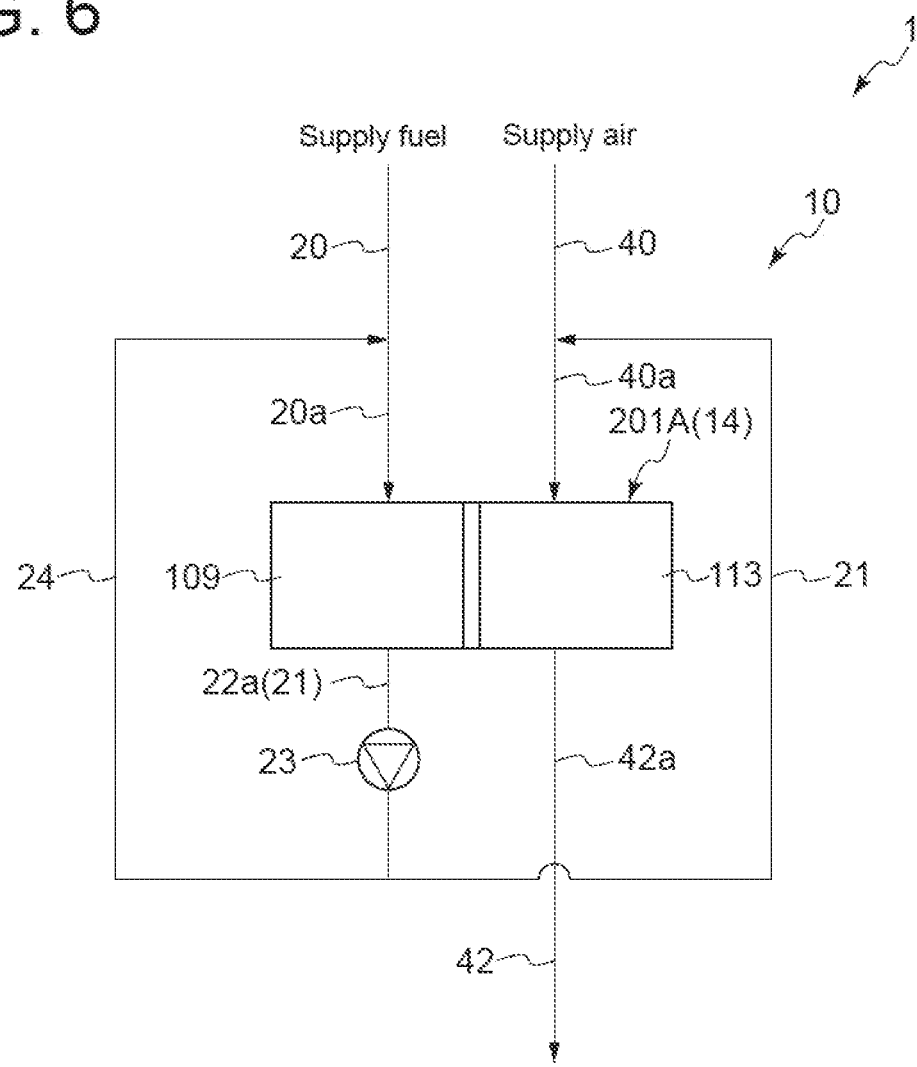
FIG. 6 is a configuration diagram of the fuel power generation system according to an embodiment.

In the exemplary embodiments shown in FIGS. 5 and 6, the fuel cell part 10 includes one fuel cell module 201, i.e., a first fuel cell module 201A. In the exemplary embodiments shown in FIGS. 7 to 10, the fuel cell part 10 includes two fuel cell modules 201, i.e., a first fuel cell module 201A and a second fuel cell module 201B.

As shown in FIGS. 5 to 10, the fuel supply line 20 is configured to supply the fuel gas to the fuel-side electrode 109 included in each fuel cell module 201 (i.e., the fuel-side electrode 109 of the fuel cell 105 constituting the fuel cell module 201).

In the exemplary embodiments shown in FIGS. 5 and 6, the fuel supply line 20 includes a first fuel supply line 20a for supplying the fuel gas to the fuel-side electrode 109 of the first fuel cell module 201A.

In the exemplary embodiments shown in FIGS. 7 to 10, the fuel supply line 20 includes a first fuel supply line 20a for supplying the fuel gas to the fuel-side electrode 109 of the first fuel cell module 201A and a second fuel supply line 20b for supplying the fuel gas to the fuel-side electrode 109 of the second fuel cell module 201B. Further, the fuel cell modules 201A and 201B are arranged in series in the flow of fuel gas. Specifically, of the two fuel cell modules 201A and 201B, the fuel-side electrode 109 of the first fuel cell module 201A on the upstream side in the fuel gas flow is supplied with the fuel gas through the first fuel supply line 20a. Meanwhile, the fuel-side electrode 109 of the second fuel cell module 201B on the downstream side in the fuel gas flow is supplied with the fuel gas through the second fuel supply line 20b.

The first fuel supply line 20a and the second fuel supply line 20b correspond to the fuel gas supply pipe 207 and the fuel gas supply branch pipe 207a (see FIG. 1) in each fuel cell module 201, respectively.

Of the fuel cell modules 201 included in the fuel cell part 10, the fuel cell module 201 disposed most downstream in the fuel gas flow is a most downstream module 14. That is, the fuel cell module 201 in the embodiment shown in FIGS. 5 and 6 is the most downstream module 14. Further, the second fuel cell module 201B in the embodiments shown in FIGS. 7 to 10 is the most downstream module 14. In the embodiments shown in FIGS. 7 to 10, the first fuel cell module 201A disposed upstream of the second fuel cell module 201B in the fuel gas flow is an upstream module 16.

The exhaust fuel gas from the fuel cell module 201 is discharged through the exhaust fuel gas line 22 (22a, 22b).

In the exemplary embodiments shown in FIGS. 5 and 6, the exhaust fuel gas from the first fuel cell module 201A is discharged through a first exhaust fuel gas line 22a. The first exhaust fuel gas line 22a is a most downstream exhaust fuel gas line 21 through which the exhaust fuel gas discharged from the most downstream module 14 (first fuel cell module 201A) flows.

In the exemplary embodiments shown in FIGS. 7 to 10, the exhaust fuel gas from the first fuel cell module 201A is discharged through a first exhaust fuel gas line 22a, and the exhaust fuel gas from the second fuel cell module 201B is discharged through a second exhaust fuel gas line 22b. The second exhaust fuel gas line 22b is a most downstream exhaust fuel gas line 21 through which the exhaust fuel gas discharged from the most downstream module 14 (second fuel cell module 201B) flows.

The first exhaust fuel gas line 22a and the second exhaust fuel gas line 22b correspond to the fuel gas exhaust pipe 209 and the fuel gas exhaust branch pipe 209a (see FIG. 1) in each fuel cell module 201, respectively.

As shown in FIGS. 5 to 10, the oxidizing gas supply line 40 is configured to supply the oxidizing gas to the oxygen-side electrode 113 included in each fuel cell module 201 (i.e., the oxygen-side electrode 113 of the fuel cell 105 constituting the fuel cell module 201).

In the exemplary embodiments shown in FIGS. 5 and 6, the oxidizing gas supply line 40 includes a first oxidizing gas supply line 40a for supplying the oxidizing gas to the oxygen-side electrode 113 of the first fuel cell module 201A.

In the exemplary embodiments shown in FIGS. 7 to 10, the oxidizing gas supply line 40 includes a first oxidizing gas supply line 40a for supplying the oxidizing gas to the oxygen-side electrode 113 of the first fuel cell module 201A and a second oxidizing gas supply line 40b for supplying the oxidizing gas to the oxygen-side electrode 113 of the second fuel cell module 201B. The first oxidizing gas supply line 40a and the second oxidizing gas supply line 40b branch from each other at a position upstream of the first fuel cell module 201A.

The first oxidizing gas supply line 40a and the second oxidizing gas supply line 40b correspond to the oxidizing gas supply pipe and the oxidizing gas supply branch pipe (not shown in FIG. 1) in each fuel cell module 201, respectively.

The exhaust oxidizing gas from the fuel cell module 201 is discharged through the exhaust oxidizing gas line 42 (42a, 42b).

In the exemplary embodiments shown in FIGS. 5 and 6, the exhaust oxidizing gas from the first fuel cell module 201A is discharged through a first exhaust oxidizing gas line 42a.

In the exemplary embodiments shown in FIGS. 7 to 10, the exhaust oxidizing gas from the first fuel cell module 201A is discharged through a first exhaust oxidizing gas line 42a, and the exhaust oxidizing gas from the second fuel cell module 201B is discharged through a second exhaust oxidizing gas line 42b. As shown in FIGS. 7 to 10, the first exhaust oxidizing gas line 42a and the second exhaust oxidizing gas line 42b may be connected so that the oxidizing gases from the plurality of fuel cell modules 201 merge before discharge.

The first exhaust oxidizing gas line 42a and the second exhaust oxidizing gas line 42b correspond to the oxidizing gas exhaust pipe and the oxidizing gas exhaust branch pipe (not shown in FIG. 1) in each fuel cell module 201, respectively.

In some embodiments, the power generation system 1 includes a recirculation line 24 for recirculating the exhaust fuel gas discharged from any fuel cell module 201 to the fuel supply line 20 corresponding to this fuel cell module 20, and a recirculation blower 23 disposed in the recirculation line 24.

In the exemplary embodiments shown in FIGS. 5 to 10, the recirculation line 24 is configured to recirculate the exhaust fuel gas discharged from the first fuel cell module 201A through the first exhaust fuel gas line 22a to the first fuel supply line 20a. A portion of the first exhaust fuel gas line 22a constitutes a portion of the recirculation line 24, and the recirculation blower 23 is disposed at the portion of the first exhaust fuel gas line 22a constituting the recirculation line 24.

In some embodiments, the most downstream exhaust fuel gas line 21 is configured to supply the exhaust fuel gas from the most downstream module 14 to the oxygen-side electrode 113 included in any fuel cell module 201 of the fuel cell part 10. The most downstream exhaust fuel gas line 21 may be connected to the oxidizing gas supply line 40 corresponding to the any fuel cell module 201 so that the exhaust fuel gas is supplied to the oxygen-side electrode 113 of this fuel cell module 201 through the oxidizing gas supply line 40. In other words, the oxidizing gas supplied from the oxidizing gas supply line 40 to the oxygen-side electrode 113 of the fuel cell module 201 may be mixed with the exhaust fuel gas from the most downstream exhaust fuel gas line 21.

In the exemplary embodiments shown in FIGS. 5 and 6, the most downstream exhaust fuel gas line 21 including the first exhaust fuel gas line 22a corresponding to the first fuel cell module 201A (most downstream module 14) is connected to the first oxidizing gas supply line 40a corresponding to the first fuel cell module 201A. Further, the exhaust fuel gas from the first fuel cell module 201A is supplied to the oxygen-side electrode 113 included in the first fuel cell module 201A through the most downstream exhaust fuel gas line 21 (including the first exhaust fuel gas line 22a) and the first oxidizing gas supply line 40a.

In the exemplary embodiments shown in FIGS. 7 to 10, the most downstream exhaust fuel gas line 21 including the second exhaust fuel gas line 22b corresponding to the second fuel cell module 201B (most downstream module 14) includes a first branch line 30 connected to the first oxidizing gas supply line 40a corresponding to the first fuel cell module 201A and a second branch line 32 connected to the second oxidizing gas supply line 40b corresponding to the second fuel cell module 201B. Further, the exhaust fuel gas from the second fuel cell module 201B is supplied to the oxygen-side electrode 113 included in the first fuel cell module 201A through the most downstream exhaust fuel gas line 21 (including the second exhaust fuel gas line 22b and the first branch line 30) and the first oxidizing gas supply line 40a, and is supplied to the oxygen-side electrode 113 included in the second fuel cell module 201B through the most downstream exhaust fuel gas line 21 (including the second exhaust fuel gas line 22b and the second branch line 32) and the second oxidizing gas supply line 40b.

The oxygen-side electrode of the fuel cell may have a structure that acts as a catalyst in the catalytic combustion reaction between fuel component and oxygen. According to the above-described embodiments, since the exhaust fuel gas discharged from the most downstream module 14 is supplied to the oxygen-side electrode 113 of any fuel cell module 201, unused fuel components contained in the exhaust fuel gas can be appropriately combusted by using the catalysis of the oxygen-side electrode 113. Specifically, since the power generation chamber 215 has a high temperature of about 600 to 1000° C. during the operation of the fuel cell module 201, there is no risk of unburned combustion in the catalytic combustion reaction at the oxygen-side electrode 113, and there is no risk of misfire because the catalytic combustion reaction is flameless. Thus, unused fuel components in the exhaust fuel gas can be stably combusted at the oxygen-side electrode 113. Therefore, it is possible to appropriately treat the exhaust fuel gas while suppressing the cost increase by eliminating the combustor which is usually provided in a flow passage for the exhaust fuel gas (i.e., a combustor for combusting the exhaust fuel gas and the exhaust oxidizing gas from the fuel cell module).

Further, since the combustor can be eliminated as described above, the system pressure loss can be reduced accordingly, and the fuel supply power and the oxidizing gas supply power (the power of booster, etc.) can be reduced.

Additionally, according to the above-described embodiments, since unused fuel components in the exhaust fuel gas are combusted at the oxygen-side electrode 113 of the fuel cell module 201, the heat generated by this combustion can be used to reduce the temperature variation in the fuel cell module 201. As a result, the power generation efficiency of the fuel cell module 201 can be increased, and the efficiency of the power generation system 1 can be improved.

Specifically, if the temperature varies in the fuel cell module 201, the power generation efficiency decreases in a low temperature portion because it is necessary to keep the maximum temperature in the fuel cell module 201 below an allowable value for the operation. Therefore, as described above, by using the heat generated by the combustion reaction at the oxygen-side electrode 113 to raise the temperature in the relatively low temperature portion of the fuel cell module 201, for example, the in-plane temperature distribution in the fuel cell cartridge 203 constituting the fuel cell module 201 can be flattened. Alternatively, by adjusting the supply amount of the exhaust fuel gas for each of the fuel cell cartridges 203, the temperature distribution among the fuel cell cartridges 203 can be flattened. Thus, the temperature variation in the fuel cell module 201 can be reduced.

Further, as described above, the combustion at the oxygen-side electrode 113 of the fuel cell module 201 makes it easier to keep the temperature in the power generation chamber 215 even during low load operation and eliminates the supply of additional fuel to the combustor for stable combustion of the exhaust fuel, thus improving the power generation efficiency during low load operation. Further, the fuel consumption amount can be reduced even in standby operation (hot standby). Additionally, since the temperature of air supplied to the fuel cell module 201 can be lowered compared to the conventional case, the heat transfer area of the heat exchanger for raising the temperature of the supply air can be reduced, and the cost can be reduced.

In some embodiments, the oxygen-side electrode 113 included in the fuel cell module 201 supplied with the exhaust fuel gas from the most downstream module 14 includes a substance having a perovskite structure. In this case, the oxygen-side electrode 113 of the fuel cell module 201 supplied with the exhaust fuel gas is composed of a substance having a perovskite crystal structure that acts as a catalyst in the catalytic combustion reaction between fuel component and oxygen. Thus, unused fuel components in the exhaust fuel gas can be appropriately combusted at the oxygen-side electrode 113.

In some embodiments, for example as shown in FIGS. 5 to 10, the most downstream exhaust fuel gas line 21 is configured such that the exhaust fuel gas divided from the recirculation line 24 flows on the downstream side of the recirculation blower 23. This exhaust fuel gas is supplied to the oxygen-side electrode 113 of the fuel cell module 201 (first fuel cell module 201A and/or second fuel cell module 201B).

In this case, the exhaust fuel gas pressurized by the recirculation blower 23 used for recirculation of the exhaust fuel gas is divided from the recirculation line 24 and is supplied to the oxygen-side electrode 113 of the fuel cell module 201 through the most downstream exhaust fuel gas line 21. Therefore, it is not necessary to provide a booster device for pressurizing the exhaust fuel gas to be supplied to the oxygen-side electrode 113 of the fuel cell module 201 in addition to the recirculation blower 23, so that the cost increase can be effectively suppressed.

Figure 7:
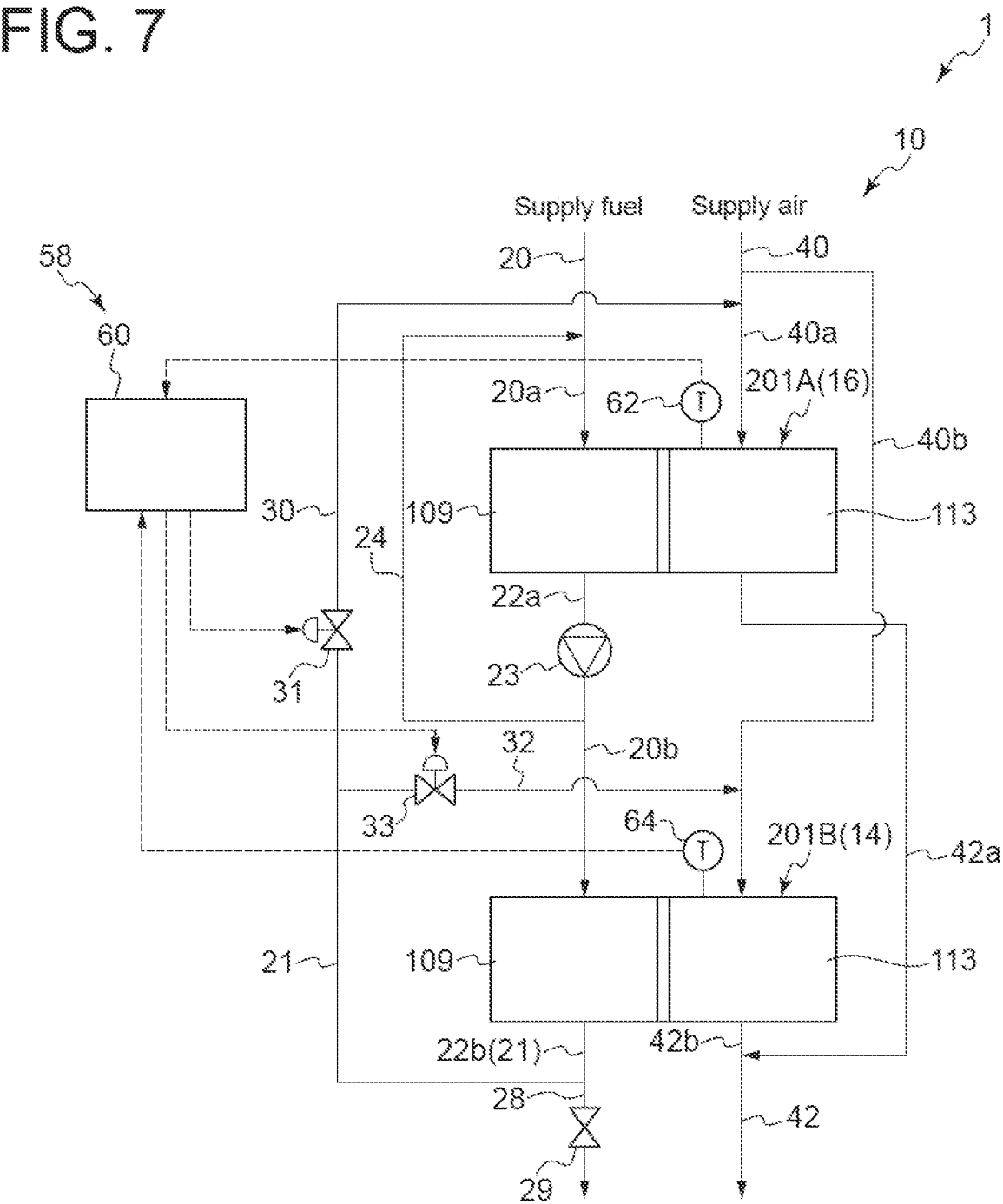
FIG. 7 is a configuration diagram of the fuel power generation system according to an embodiment.
Figure 9:
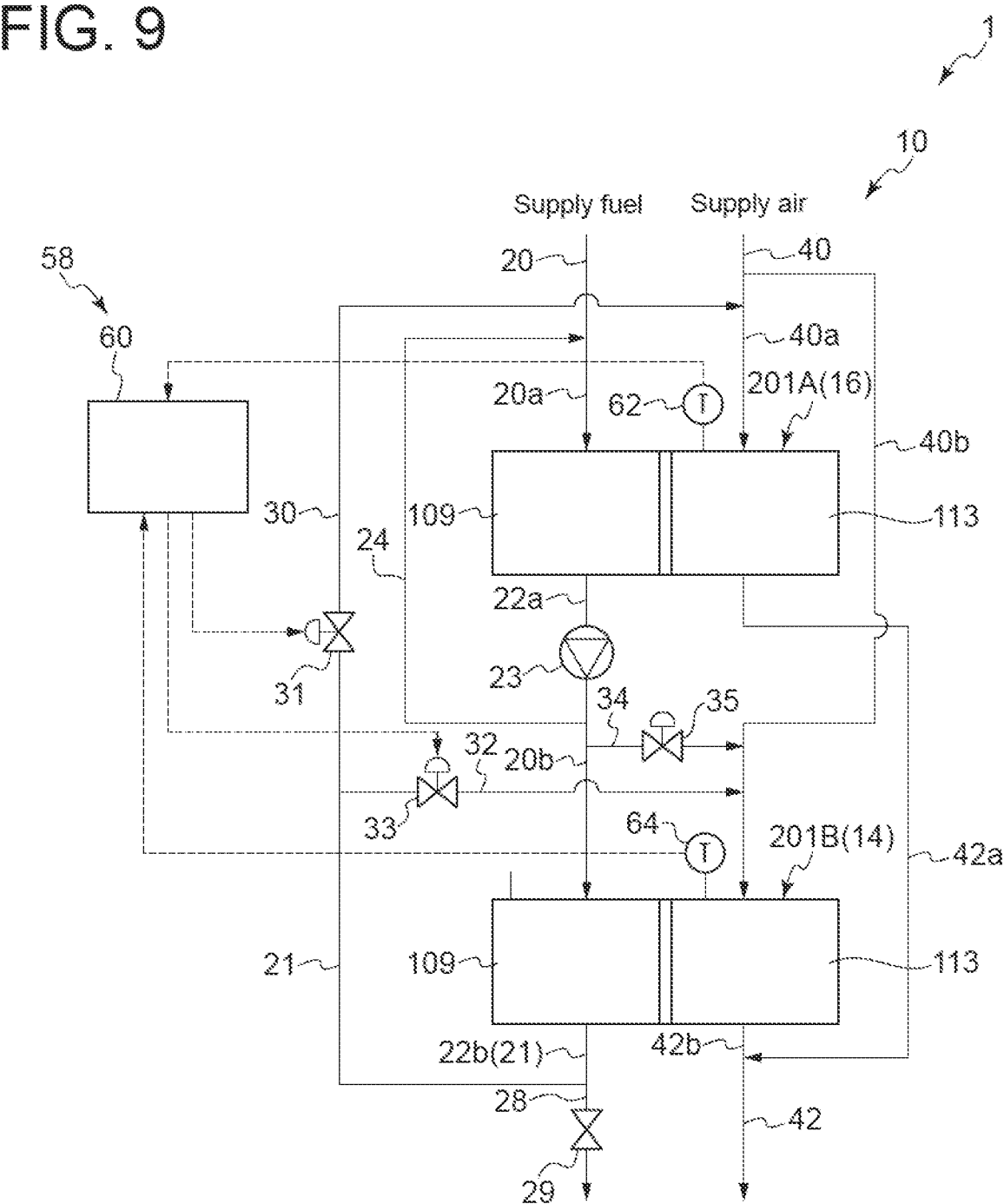
FIG. 9 is a configuration diagram of the fuel power generation system according to an embodiment.

In some embodiments, for example, as shown in FIGS. 5, 7, and 9, the power generation system 1 includes an exhaust line 28 branched from the most downstream exhaust fuel gas line 21 and an exhaust valve 29 disposed in the exhaust line 28. In this case, for example, by adjusting the opening degree of the exhaust valve 29, the amount of exhaust fuel gas supplied to the oxygen-side electrode 113 of the fuel cell module 201 through the most downstream exhaust fuel gas line 21 can be adjusted. As a result, it is possible to suppress excessive temperature rise of the fuel cell module 201 supplied with the exhaust fuel gas through the most downstream exhaust fuel gas line 21.

Figure 8:
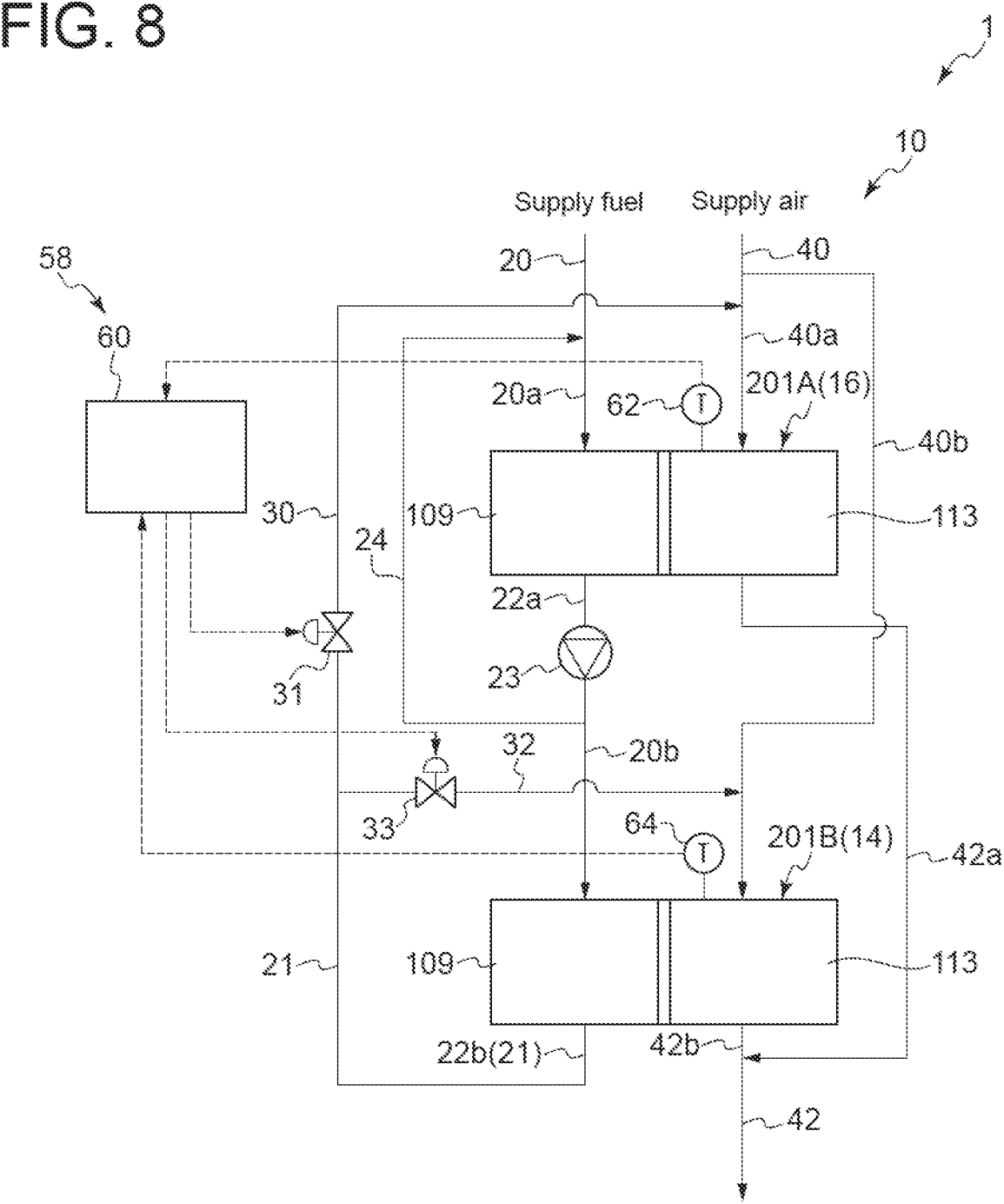
FIG. 8 is a configuration diagram of the fuel power generation system according to an embodiment.
Figure 10:
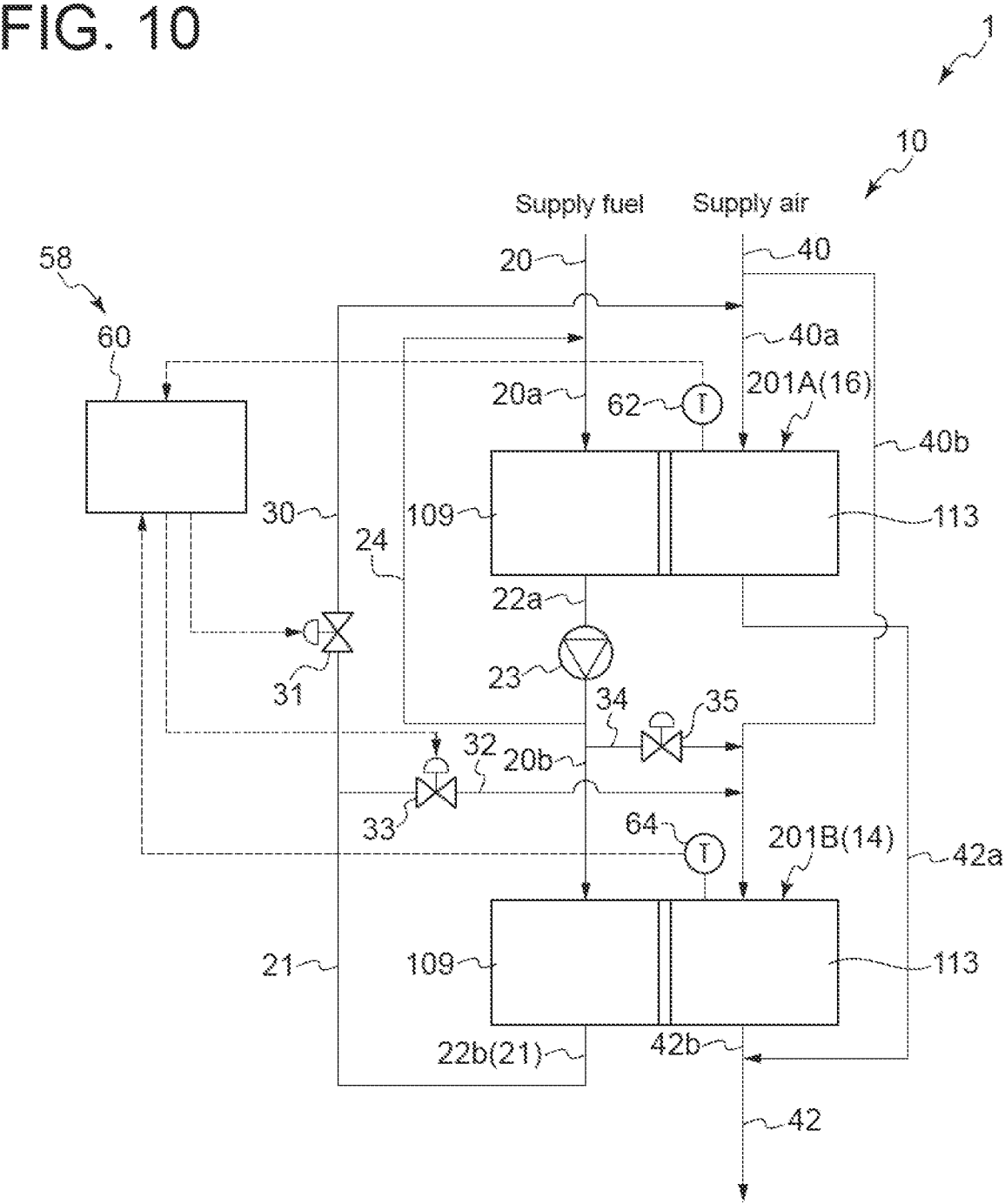
FIG. 10 is a configuration diagram of the fuel power generation system according to an embodiment.

In some embodiments, for example as shown in FIGS. 6, 8, and 10, the exhaust fuel gas discharged from the most downstream module 14 (first fuel cell module 201A or second fuel cell module 201B) is wholly supplied to the oxygen-side electrode 113 included in the fuel cell module 201 (first fuel cell module 201A and/or second fuel cell module 201B) through the most downstream exhaust fuel gas line 21. In other words, in these embodiments, the power generation system 1 is not provided with the exhaust line 28 and the exhaust valve 29, and the exhaust fuel gas discharged from the most downstream module 14 is wholly supplied to the oxygen-side electrode 113 of any fuel cell module 201 before release from the system.

According to the above-described embodiments, since the exhaust fuel gas discharged from the most downstream module 14 is wholly supplied to the oxygen-side electrode 113 included in the fuel cell module 201, the whole exhaust fuel gas can be appropriately combusted at the oxygen-side electrode 113.

In some embodiments, the power generation system 1 includes an upstream exhaust fuel gas line for supplying the exhaust fuel gas discharged from the upstream module 16 of the plurality of fuel cell modules 201 to the oxygen-side electrode 113 included in any of the fuel cell modules 201.

In the exemplary embodiments shown in FIGS. 9 and 10, an upstream exhaust fuel gas line 34 is branched from the first exhaust fuel gas line 22a corresponding to the first fuel cell module 201A (upstream module 16) and is connected to the second oxidizing gas supply line 40b corresponding to the second fuel cell module 201B. Further, the exhaust fuel gas discharged from the first fuel cell module 201A (upstream module 16) is supplied to the oxygen-side electrode 113 included in the second fuel cell module 201B through the upstream exhaust fuel gas line 34 and the second oxidizing gas supply line 40b.

According to the above-described embodiments, since the exhaust fuel gases with different concentrations of unused fuel components discharged from the most downstream module 14 (second fuel cell module 201B) and the upstream module 16 (first fuel cell module 201A) are supplied to the oxygen-side electrode 113 of the fuel cell module 201 (first fuel cell module 201A and/or second fuel cell module 201B), the temperature of the fuel cell module 201 supplied with the exhaust fuel gas can be flexibly adjusted. As a result, the power generation efficiency of the fuel cell module 201 can be easily increased, and the efficiency of the power generation system 1 can be easily improved.

In some embodiments, for example as shown in FIGS. 7 to 10, the power generation system 1 may include a supply amount adjustment part 58 for adjusting the supply amount of the exhaust fuel gas to the oxygen-side electrode 113 of the fuel cell module 201 through the most downstream exhaust fuel gas line 21 or the upstream exhaust fuel gas line 34, on the basis of the temperature of the power generation chamber 215 of the fuel cell module 201 (first fuel cell module 201A and/or second fuel cell module 201B).

In this case, since the supply amount of the exhaust fuel gas to the oxygen-side electrode 113 through the most downstream exhaust fuel gas line 21 or the upstream exhaust fuel gas line 34 is adjusted on the basis of the temperature of the power generation chamber 215 of the fuel cell module 201, the temperature variation in the fuel cell module 201 can be effectively reduced. As a result, the power generation efficiency of the power generation system 1 including the fuel cell module 201 can be effectively increased.

In the exemplary embodiments shown in FIGS. 7 to 10, the supply amount adjustment part 58 includes a valve disposed in the most downstream exhaust fuel gas line 21, namely, a valve 31 disposed in the first branch line 30 and a valve 33 disposed in the second branch line 32. Further, the supply amount adjustment part 58 includes a temperature sensor 62 configured to detect the temperature of the power generation chamber 215 of the first fuel cell module 201A and a temperature sensor 64 configured to detect the temperature of the power generation chamber 215 of the second fuel cell module 201B.

In the exemplary embodiments shown in FIGS. 9 and 10, the supply amount adjustment part 58 further includes a valve 35 disposed in the upstream exhaust fuel gas line 34.

The supply amount adjustment part 58 may further include a controller 60 for adjusting the opening degrees of the valves 31, 33, 35. The controller 60 may be configured to receive signals from the temperature sensors 62 and 64 indicating the temperature detection results of the power generation chambers 215 of the first fuel cell module 201A and the second fuel cell module 201B. The controller 60 may be configured to adjust the opening degrees of the valves 31, 33, 35 based on the temperature detection results received from the temperature sensors 62, 64.

In the exemplary embodiments shown in FIGS. 7 to 10, the supply amount adjustment part 58 may be configured to adjust a ratio of the supply amount of the exhaust fuel gas to the oxygen-side electrode 113 of the first fuel cell module 201A through the first branch line 30 and the supply amount of the exhaust fuel gas to the oxygen-side electrode 113 of the second fuel cell module 201B through the second branch line 32, on the basis of the temperature of the power generation chamber 215 of the first fuel cell module 201A and the temperature of the power generation chamber 215 of the second fuel cell module 201B.

In this case, the balance between the temperature of the power generation chamber 215 of the first fuel cell module 201A and the temperature of the power generation chamber 215 of the second fuel cell module 201B can be made appropriate. Therefore, the efficiency of the power generation system 1 can be improved.

In the exemplary embodiments shown in FIGS. 9 and 10, the supply amount adjustment part 58 may be configured to adjust the supply amount of the fuel gas to the oxygen-side electrode 113 of the first fuel cell module 201A through the most downstream exhaust fuel gas line 21 (including the first branch line 30), the supply amount of the fuel gas to the oxygen-side electrode 113 of the second fuel cell module 201B through the most downstream exhaust fuel gas line 21 (including the second branch line 32), and the supply amount of the fuel gas to the oxygen-side electrode 113 of the second fuel cell module 201B through the upstream exhaust fuel gas line 34, on the basis of the temperature of the power generation chamber 215 of the first fuel cell module 201A and the temperature of the power generation chamber 215 of the second fuel cell module 201B.

In this case, the supply amount of the exhaust fuel gas from the most downstream module 14 and the supply amount of the exhaust fuel gas from the upstream module 16 are adjusted on the basis of the temperatures of the power generation chambers 215 of the first fuel cell module 201A and the second fuel cell module 201B including the oxygen-side electrodes 113 supplied with the exhaust fuel gas. In other words, since the supply amount and the supply ratio of the exhaust fuel gases with different concentrations of unused fuel components are adjusted, the temperature of the fuel cell module 201 supplied with the exhaust fuel gas can be adjusted more flexibly. As a result, the power generation efficiency of the power generation system 1 can be effectively increased.

The power generation system 1 shown in FIGS. 5 to 10 is configured such that the exhaust fuel gas from the most downstream module 14 is discharged not via a combustor for combusting the exhaust fuel gas and the exhaust oxidizing gas from any fuel cell module 201. Alternatively, in the power generation system 1, the exhaust fuel gas from the most downstream module 14 is discharged through the exhaust oxidizing gas line 42 not via the combustor.

Alternatively, in some embodiments, in the power generation system 1, a combustor for combusting the exhaust fuel gas from the most downstream module 14 and the exhaust oxidizing gas from any fuel cell module 201 is not provided in the exhaust fuel gas line 22 and the exhaust oxidizing gas line 42.

According to the above-described embodiments, as already described, since the exhaust fuel gas discharged from the most downstream module 14 is supplied to the oxygen-side electrode 113 of the fuel cell module 201, unused fuel components contained in the exhaust fuel gas can be appropriately combusted at the oxygen-side electrode 113. Therefore, the combustor which is usually provided for combusting the exhaust fuel gas and the exhaust oxidizing gas from the fuel cell module 201 can be eliminated, and the exhaust fuel gas can be appropriately treated while suppressing the cost increase.

The power generation system 1 shown in FIGS. 5 to 10 is configured to discharge the exhaust fuel gas from the most downstream module 14 not via a methane processor. In other words, in the power generation system 1, the methane processor for reducing methane in the exhaust fuel gas is not disposed in the exhaust fuel gas line 22 and the exhaust oxidizing gas line 42.

Exhaust fuel gas discharged from a fuel cell usually contains unused fuel including methane. Therefore, conventionally, exhaust fuel gas from a fuel cell is treated with a methane processor disposed in an exhaust passage for the exhaust fuel gas to reduce the methane concentration before release from the system. The methane processor may use a precious metal catalyst that reacts methane with an oxidizing gas. In this regard, according to the above-described embodiments, since the exhaust fuel gas discharged from the most downstream module 14 is supplied to the oxygen-side electrode 113 of the fuel cell module 201, unused fuel components including methane contained in the exhaust fuel gas can be appropriately combusted at the oxygen-side electrode 113. Therefore, the methane processor can be eliminated, so that the exhaust fuel gas can be appropriately treated while suppressing the cost increase.

The contents described in the above embodiments would be understood as follows, for instance.

(1) A fuel cell power generation system (e.g., the above-described power generation system 1) according to at least one embodiment of the present invention is provided with: at least one fuel cell module (e.g., the above-described first fuel cell module 201A and/or second fuel cell module 201B) each of which includes a fuel cell (105) having a fuel-side electrode (109), an electrolyte (111), and an oxygen-side electrode (113); at least one fuel supply line (20) for supplying a fuel gas to the fuel-side electrode included in the at least one fuel cell module; at least one oxidizing gas supply line (40) for supplying an oxidizing gas to the oxygen-side electrode included in the at least one fuel cell module; and a most downstream exhaust fuel gas line (21) through which an exhaust fuel gas discharged from a most downstream module (14) that is disposed most downstream in a flow of the fuel gas among the at least one fuel cell module flows. The most downstream exhaust fuel gas line is configured to supply the exhaust fuel gas to the oxygen-side electrode included in any of the at least one fuel cell module (e.g., the above-described first fuel cell module 201A or second fuel cell module 201B).

The oxygen-side electrode of the fuel cell may have a structure that acts as a catalyst in the catalytic combustion reaction between fuel component and oxygen. According to the above configuration (1), since the exhaust fuel gas discharged from the most downstream module (fuel cell module) is supplied to the oxygen-side electrode of the fuel cell module, unused fuel components contained in the exhaust fuel gas can be appropriately combusted at the oxygen-side electrode. Therefore, it is possible to appropriately treat the exhaust fuel gas while suppressing the cost increase by eliminating a combustor which is usually provided in a flow passage for the exhaust fuel gas (i.e., a combustor for combusting the exhaust fuel gas and the exhaust oxidizing gas from the fuel cell module).

Additionally, according to the above configuration (1), since unused fuel components in the exhaust fuel gas are combusted at the oxygen-side electrode of the fuel cell module, the heat generated by this combustion can be used to reduce the temperature variation in the fuel cell module. As a result, the power generation efficiency of the fuel cell module can be increased, and the efficiency of the fuel cell power generation system can be improved.

(2) In some embodiments, in the above configuration (1), the most downstream exhaust fuel gas line is connected to the oxidizing gas supply line (e.g., the above-described first oxidizing gas supply line 40a or second oxidizing gas supply line 40b) corresponding to the any of the at least one fuel cell module (e.g., the above-described first fuel cell module 201A or second fuel cell module 201B).

According to the above configuration (2), since the exhaust fuel gas flowing through the most downstream exhaust fuel gas line is supplied to the fuel cell module through the oxidizing gas supply line, the exhaust fuel gas can be efficiently supplied to the oxygen-side electrode of each fuel cell constituting the fuel cell module.

(3) In some embodiments, in the above configuration (1) or (2), the fuel cell power generation system is configured such that the exhaust fuel gas discharged from the most downstream module is wholly supplied to the oxygen-side electrode included in the any of the at least one fuel cell module (e.g., the above-described first fuel cell module 201A and/or second fuel cell module 201B) through the most downstream exhaust fuel gas line.

According to the above configuration (3), since the exhaust fuel gas discharged from the most downstream module is wholly supplied to the oxygen-side electrode included in the fuel cell module, the whole exhaust fuel gas can be appropriately combusted at the oxygen-side electrode. Therefore, the exhaust fuel gas can be appropriately treated while suppressing the cost increase.

(4) In some embodiments, in any one of the above configurations (1) to (3), the fuel cell power generation system comprises a supply amount adjustment part (58) for adjusting a supply amount of the exhaust fuel gas to the oxygen-side electrode through the most downstream exhaust fuel gas line, on the basis of a temperature of a power generation chamber of the any of the at least one fuel cell module (e.g., the above-described first fuel cell module 201A and/or second fuel cell module 201B).

According to the above configuration (4), since the supply amount of the exhaust fuel gas to the oxygen-side electrode through the most downstream exhaust fuel gas line is adjusted on the basis of the temperature of the power generation chamber of the fuel cell module, the temperature variation in the fuel cell module can be effectively reduced. As a result, the power generation efficiency of the fuel cell module can be effectively increased.

(5) In some embodiments, in any one of the above configurations (1) to (4), the at least one fuel cell module includes a plurality of fuel cell modules including a first module (e.g., the above-described first fuel cell module 201A) and a second module (e.g., the above-described second fuel cell module 201B). The most downstream exhaust fuel gas line includes: a first branch line (30) for supplying the exhaust fuel gas discharged from the most downstream module to the oxygen-side electrode of the first module; and a second branch line (32) for supplying the exhaust fuel gas discharged from the most downstream module to the oxygen-side electrode of the second module.

According to the above configuration (5), since the exhaust fuel gas discharged from the most downstream module is supplied to the oxygen-side electrode of each of the fuel cell modules, unused fuel components contained in the exhaust fuel gas can be effectively combusted using the oxygen-side electrodes of the plurality of fuel cell modules.

(6) In some embodiments, in the above configuration (5), the fuel cell power generation system comprises a supply amount adjustment part configured to adjustment a ratio of a supply amount of the exhaust fuel gas to the oxygen-side electrode of the first module through the first branch line and a supply amount of the exhaust fuel gas to the oxygen-side electrode of the second module through the second branch line, on the basis of a temperature of a power generation chamber of the first module and a temperature of a power generation chamber of the second module.

According to the above configuration (6), since the ratio of the supply amount of the exhaust fuel gas to the oxygen-side electrode of the first module and the supply amount of the exhaust fuel gas to the oxygen-side electrode of the second module is adjusted on the basis of the temperature of the power generation chamber of the first module and the temperature of the power generation chamber of the second module, the balance between the temperature of the power generation chamber of the first module and the temperature of the power generation chamber of the second module can be made appropriate. Therefore, the efficiency of the fuel cell power generation system can be improved.

(7) In some embodiments, in any one of the above configurations (1) to (6), the at least one fuel cell module includes a plurality of fuel cell modules including the most downstream module (14, e.g., the above-described second fuel cell module 201B) and an upstream module (16, e.g., the above-described first fuel cell module 201A) disposed upstream of the most downstream module in the flow of the fuel gas. The fuel cell power generation system comprises an upstream exhaust fuel gas line (34) for supplying an exhaust fuel gas discharged from the upstream module to the oxygen-side electrode included in any of the at least one fuel cell module (e.g., the above-described second fuel cell module 201B).

According to the above configuration (7), since the exhaust fuel gases with different concentrations of unused fuel components discharged from the most downstream module and the upstream module are supplied to the oxygen-side electrode of the fuel cell module, the temperature of the fuel cell module supplied with the exhaust fuel gas can be flexibly adjusted. As a result, the power generation efficiency of the fuel cell module can be easily increased, and the efficiency of the fuel cell power generation system can be easily improved.

(8) In some embodiments, in the above configuration (7), the fuel cell power generation system comprises a supply amount adjustment part (58) for adjusting a supply amount of the exhaust fuel gas to the oxygen-side electrode through the most downstream exhaust fuel gas line and a supply amount of the exhaust fuel gas to the oxygen-side electrode through the upstream exhaust fuel gas line, on the basis of a temperature of a power generation chamber of the at least one fuel cell module.

According to the above configuration (8), since the supply amount of the exhaust fuel gas from the most downstream module and the supply amount of the exhaust fuel gas from the upstream module are adjusted on the basis of the temperature of the power generation chamber of the fuel cell module including the oxygen-side electrode supplied with the exhaust fuel gas, the temperature of the fuel cell module supplied with the exhaust fuel gas can be appropriately adjusted. As a result, the power generation efficiency of the fuel cell module can be effectively increased, and the efficiency of the fuel cell power generation system can be improved.

(9) In some embodiments, in any one of the above configurations (1) to (8), the fuel cell power generation system comprises: a recirculation line (24) for recirculating an exhaust fuel gas discharged from any of the at least one fuel cell module to the fuel supply line corresponding to the any of the at least one fuel cell module; and a recirculation blower (23) disposed in the recirculation line. The most downstream exhaust fuel gas line is configured such that the exhaust fuel gas divided from the recirculation line flows on a downstream side of the recirculation blower.

According to the above configuration (9), the exhaust fuel gas pressurized by the recirculation blower used for recirculation of the exhaust fuel gas is divided from the recirculation line and is supplied to the oxygen-side electrode of the fuel cell module through the most downstream exhaust fuel gas line. Therefore, it is not necessary to provide a booster device for pressurizing the exhaust fuel gas to be supplied to the oxygen-side electrode of the fuel cell module in addition to the recirculation blower, so that the cost increase can be effectively suppressed.

(10) In some embodiments, in any one of the above configurations (1) to (9), the fuel cell power generation system is configured such that the exhaust fuel gas from the most downstream module is discharged not via a combustor for combusting the exhaust fuel gas and an exhaust oxidizing gas from the at least one fuel cell module.

According to the above configuration (10), as described in (1), since the exhaust fuel gas discharged from the most downstream module is supplied to the oxygen-side electrode of the fuel cell module, unused fuel components contained in the exhaust fuel gas can be appropriately combusted at the oxygen-side electrode. Therefore, the combustor which is usually provided for combusting the exhaust fuel gas and the exhaust oxidizing gas from the fuel cell module can be eliminated, and the exhaust fuel gas can be appropriately treated while suppressing the cost increase.

(11) In some embodiments, in any one of the above configurations (1) to (10), the fuel cell power generation system is configured such that the exhaust fuel gas from the most downstream module is discharged not via a methane processor.

Exhaust fuel gas discharged from a fuel cell usually contains unused fuel including methane. Therefore, conventionally, exhaust fuel gas from a fuel cell is treated with a methane processor disposed in an exhaust passage for the exhaust fuel gas to reduce the methane concentration before release from the system. In this regard, according to the above configuration (11), since the exhaust fuel gas discharged from the most downstream module is supplied to the oxygen-side electrode of the fuel cell module, unused fuel components including methane contained in the exhaust fuel gas can be appropriately combusted at the oxygen-side electrode. Therefore, the methane processor can be eliminated, so that the exhaust fuel gas can be appropriately treated while suppressing the cost increase.

(12) In some embodiments, in any one of the above configurations (1) to (11), the oxygen-side electrode included in the at least one fuel cell module includes a substance having a perovskite crystal structure.

According to the above configuration (12), the oxygen-side electrode of the fuel cell module supplied with the exhaust fuel gas is composed of a substance having a perovskite crystal structure that acts as a catalyst in the catalytic combustion reaction between fuel component and oxygen. Thus, unused fuel components in the exhaust fuel gas can be appropriately combusted at the oxygen-side electrode. Therefore, it is possible to appropriately treat the exhaust fuel gas while suppressing the cost increase by eliminating the combustor which is usually provided in a flow passage for the exhaust fuel gas.

(13) In some embodiments, in any one of the above configurations (1) to (12), the fuel cell power generation system comprises a booster (e.g., the above-described compressor 50) configured to pressurize the oxidizing gas supplied to the oxygen-side electrode.

According to the above configuration (13), since the oxidizing gas pressurized by the booster is supplied to the oxygen-side electrode of the fuel cell module, the power generation efficiency of the fuel cell module can be increased.

(14) In some embodiments, in any one of the above configurations (1) to (13), the fuel cell power generation system comprises a turbine (52) configured to be driven by an exhaust oxidizing gas discharged from the oxygen-side electrode.

According to the above configuration (14), since the turbine is driven by the exhaust oxidizing gas from the fuel cell module, the pressure energy of the exhaust oxidizing gas can be converted into mechanical energy by the turbine and effectively used.

(15) In some embodiments, in the above configuration (14), a combustor is not disposed between the oxygen-side electrode and the turbine.

According to the above configuration (15), as described in (1), since the exhaust fuel gas discharged from the most downstream module is supplied to the oxygen-side electrode of the fuel cell module, unused fuel components contained in the exhaust fuel gas can be appropriately combusted at the oxygen-side electrode. Therefore, the combustor which is usually provided for combusting the exhaust fuel gas and the exhaust oxidizing gas from the fuel cell module can be eliminated, and the exhaust fuel gas can be appropriately treated while suppressing the cost increase.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Power generation system
10 Fuel cell part
14 Most downstream module
16 Upstream module
20 Fuel supply line
20a First fuel supply line
20b Second fuel supply line
21 Most downstream exhaust fuel gas line
22 Exhaust fuel gas line
22a First exhaust fuel gas line
22b Second exhaust fuel gas line
23 Recirculation blower
24 Recirculation line
28 Exhaust line
29 Exhaust valve
30 First branch line
31 Valve
32 Second branch line
33 Valve
34 Upstream exhaust fuel gas line
35 Valve
40 Oxidizing gas supply line
40a First oxidizing gas supply line
40b Second oxidizing gas supply line
42 Exhaust oxidizing gas line
42a First exhaust oxidizing gas line
42b Second exhaust oxidizing gas line
50 Compressor (Booster)
52 Turbine
54 Rotational shaft
58 Supply amount adjustment part
60 Controller
62 Temperature sensor
64 Temperature sensor
101 Cell stack
103 Substrate tube
105 Fuel cell
107 Interconnector
109 Fuel-side electrode
111 Electrolyte
113 Oxygen-side electrode
115 Lead film
201 Fuel cell module (SOFC module)
201A First fuel cell module
201B Second fuel cell module
203 Fuel cell cartridge (SOFC cartridge)
205 Pressure vessel
207 Fuel gas supply pipe
207a Fuel gas supply branch pipe
209 Fuel gas exhaust pipe
209a Fuel gas exhaust branch pipe
215 Power generation chamber
217 Fuel gas supply header
219 Fuel gas exhaust header
221 Oxidizing gas supply header
223 Oxidizing gas exhaust header
225a Upper tube plate
225b Lower tube plate
227a Upper heat insulation body
227b Lower heat insulation body
229a Upper casing
229b Lower casing
231a Fuel gas supply hole
231b Fuel gas exhaust hole
233a Oxidizing gas supply hole
233b Oxidizing gas exhaust hole
235a Oxidizing gas supply gap
235b Oxidizing gas exhaust gap
237a Seal member
237b Seal member

The invention claimed is:

1. A fuel cell power generation system, comprising:
at least one fuel cell module each of which includes a fuel cell having a fuel-side electrode, an electrolyte, and an oxygen-side electrode;
at least one fuel supply line for supplying a fuel gas to the fuel-side electrode included in the at least one fuel cell module;
at least one oxidizing gas supply line for supplying an oxidizing gas to the oxygen-side electrode included in the at least one fuel cell module; and
a most downstream exhaust fuel gas line through which an exhaust fuel gas discharged from a most downstream module that is disposed most downstream in a flow of the fuel gas among the at least one fuel cell module flows,
wherein the most downstream exhaust fuel gas line is configured to supply the exhaust fuel gas to the oxygen-side electrode included in any of the at least one fuel cell module,
wherein the at least one fuel cell module includes a plurality of fuel cell modules including a first module and a second module, and
wherein the most downstream exhaust fuel gas line includes:
a first branch line for supplying the exhaust fuel gas discharged from the most downstream module to the oxygen-side electrode of the first module; and
a second branch line for supplying the exhaust fuel gas discharged from the most downstream module to the oxygen-side electrode of the second module.

2. The fuel cell power generation system according to claim 1,
wherein the most downstream exhaust fuel gas line is connected to the oxidizing gas supply line corresponding to the any of the at least one fuel cell module.

3. The fuel cell power generation system according to claim 1,
wherein the fuel cell power generation system is configured such that the exhaust fuel gas discharged from the most downstream module is wholly supplied to the oxygen-side electrode included in the any of the at least one fuel cell module through the most downstream exhaust fuel gas line.

4. The fuel cell power generation system according to claim 1, comprising a supply amount adjustment part for adjusting a supply amount of the exhaust fuel gas to the oxygen-side electrode through the most downstream exhaust fuel gas line, on the basis of a temperature of a power generation chamber of the any of the at least one fuel cell module.

5. The fuel cell power generation system according to claim 1, comprising a supply amount adjustment part configured to adjust a ratio A1/A2 of a supply amount A1 of the exhaust fuel gas to the oxygen-side electrode of the first module through the first branch line to a supply amount A2 of the exhaust fuel gas to the oxygen-side electrode of the second module through the second branch line, on the basis of a temperature of a power generation chamber of the first module and a temperature of a power generation chamber of the second module.

6. The fuel cell power generation system according to claim 1,
   wherein the at least one fuel cell module includes a plurality of fuel cell modules including the most downstream module and an upstream module disposed upstream of the most downstream module in the flow of the fuel gas, and
   wherein the fuel cell power generation system comprises an upstream exhaust fuel gas line for supplying an exhaust fuel gas discharged from the upstream module to the oxygen-side electrode included in any of the at least one fuel cell module.

7. The fuel cell power generation system according to claim 6, comprising a supply amount adjustment part for adjusting a supply amount of the exhaust fuel gas to the oxygen-side electrode through the most downstream exhaust fuel gas line and a supply amount of the exhaust fuel gas to the oxygen-side electrode through the upstream exhaust fuel gas line, on the basis of a temperature of a power generation chamber of the at least one fuel cell module.

8. The fuel cell power generation system according to claim 1, comprising:
   a recirculation line for recirculating an exhaust fuel gas discharged from any of the at least one fuel cell module to the fuel supply line corresponding to the any of the at least one fuel cell module; and
   a recirculation blower disposed in the recirculation line,
   wherein the most downstream exhaust fuel gas line is configured such that the exhaust fuel gas divided from the recirculation line flows on a downstream side of the recirculation blower.

9. The fuel cell power generation system according to claim 1,
   wherein the fuel cell power generation system is configured such that the exhaust fuel gas from the most downstream module is discharged not via a combustor for combusting the exhaust fuel gas and an exhaust oxidizing gas from the at least one fuel cell module.

10. The fuel cell power generation system according to claim 1,
    wherein the fuel cell power generation system is configured such that the exhaust fuel gas from the most downstream module is discharged not via a methane processor.

11. The fuel cell power generation system according to claim 1,
    wherein the oxygen-side electrode included in the at least one fuel cell module includes a substance having a perovskite structure.

12. The fuel cell power generation system according to claim 1, comprising a booster configured to pressurize the oxidizing gas supplied to the oxygen-side electrode.

13. The fuel cell power generation system according to claim 1, comprising a turbine configured to be driven by an exhaust oxidizing gas discharged from the oxygen-side electrode.

14. The fuel cell power generation system according to claim 13,
    wherein a combustor is not disposed between the oxygen-side electrode and the turbine.

* * * * *